(12) United States Patent
Feng

(10) Patent No.: US 12,279,047 B2
(45) Date of Patent: Apr. 15, 2025

(54) PHOTOGRAPHING METHOD AND RELATED APPARATUS

(71) Applicant: Honor Device Co., Ltd., Shenzhen (CN)

(72) Inventor: Hanyu Feng, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/251,016

(22) PCT Filed: May 18, 2022

(86) PCT No.: PCT/CN2022/093646
§ 371 (c)(1),
(2) Date: Apr. 28, 2023

(87) PCT Pub. No.: WO2022/267763
PCT Pub. Date: Dec. 29, 2022

(65) Prior Publication Data
US 2023/0412929 A1    Dec. 21, 2023

(30) Foreign Application Priority Data

Jun. 24, 2021   (CN) .......................... 202110706653.1

(51) Int. Cl.
*H04N 23/745*     (2023.01)
*H04N 23/63*     (2023.01)
(Continued)

(52) U.S. Cl.
CPC ......... *H04N 23/745* (2023.01); *H04N 23/631* (2023.01); *H04N 23/6811* (2023.01);
(Continued)

(58) Field of Classification Search
CPC ............... H04N 23/745; H04N 23/631; H04N 23/6811; H04N 23/682; H04N 23/73; H04N 23/743; H04N 23/63; H04N 23/76
See application file for complete search history.

(56) References Cited

U.S. PATENT DOCUMENTS 10,070,067 B2 *   9/2018   Jo ........................ H04N 23/683
11,765,463 B2     9/2023   Li et al.
(Continued)

FOREIGN PATENT DOCUMENTS

CN      102752513 A     10/2012
CN      104104882 A     10/2014
(Continued)

*Primary Examiner* — Sinh Tran
*Assistant Examiner* — Angel L Garces-Rivera
(74) *Attorney, Agent, or Firm* — Slater Matsil, LLP

(57) ABSTRACT

This application discloses a photographing method and a related apparatus. The method includes the following steps: An electronic device detects a motion status of a photographed subject; if the photographed subject is moving relative to the electronic device, the electronic device determines whether an artificial light source is present in a current photographing environment; and if an artificial light source is present in the current photographing environment, the electronic device determines a frame interval based on a flicker frequency of the artificial light source, and may also reduce an exposure time by a step size B.

17 Claims, 16 Drawing Sheets

(51) Int. Cl.
*H04N 23/68* (2023.01)
*H04N 23/73* (2023.01)
*H04N 23/743* (2023.01)

(52) U.S. Cl.
CPC ........... *H04N 23/682* (2023.01); *H04N 23/73* (2023.01); *H04N 23/743* (2023.01)

(56) References Cited

U.S. PATENT DOCUMENTS

| | | |
|---|---|---|
| 2002/0044205 A1 | 4/2002 | Nagaoka et al. |
| 2010/0079617 A1 | 4/2010 | Kosaka |
| 2012/0057046 A1 | 3/2012 | Tanaka |
| 2017/0094148 A1 | 3/2017 | Tsukagoshi et al. |
| 2017/0187960 A1 | 6/2017 | Tsuchiya |
| 2020/0213511 A1 | 7/2020 | Suzuki et al. |

FOREIGN PATENT DOCUMENTS

| | | |
|---|---|---|
| CN | 106559623 A | 4/2017 |
| CN | 110035234 A | 7/2019 |
| CN | 111163270 A | 5/2020 |
| WO | 2020158069 A1 | 8/2020 |
| WO | 2020186969 A1 | 9/2020 |

\* cited by examiner

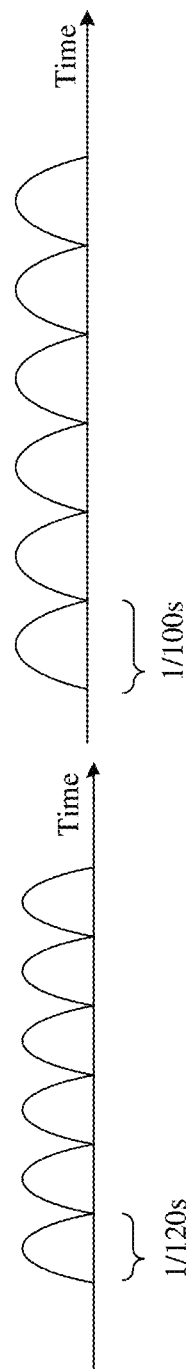

PHOTOGRAPHING METHOD AND RELATED APPARATUS

CROSS-REFERENCE TO RELATED APPLICATIONS

This application is a national stage of International Application No. PCT/CN2022/093646, filed on May 18, 2022, which claims priority to Chinese Patent Application No. 202110706653.1, filed on Jun. 24, 2021, both of which are incorporated herein by reference in their entireties.

TECHNICAL FIELD

This application relates to the field of terminal technologies, and in particular, to a photographing method and a related apparatus.

BACKGROUND

When a photographing electronic device such as a digital camera or a mobile phone is moving relative to a photographed subject, if an exposure time is excessively long, a motion blur may occur in a captured image. To attenuate the motion blur, the electronic device may reduce the exposure time. If an artificial light source is present in the foregoing photographing scenario, to avoid scrolling bright and dark streaks in captured images, the electronic device usually adjusts the exposure time by taking an integer multiple of a flicker period of the artificial light source as an adjustment interval. When the exposure time is reduced, the electronic device needs to increase a light sensitivity ISO to maintain appropriate brightness of a captured image. An excessively higher ISO results in a large quantity of noise in the captured image. When the electronic device reduces the exposure time under the condition that the exposure time is an integer multiple of the flicker period of the artificial light source, the ISO may increase excessively in a short time and the electronic device cannot adjust a noise reduction parameter in a timely manner. Then, a large quantity of noise is included in the captured image, thereby affecting a photographing effect.

Therefore, how to not only reduce occurrences of scrolling bright and dark streaks in captured images but also avoid a large quantity of noise caused by a drastic change in ISO in the captured images is an urgent problem to be solved.

SUMMARY

This application provides a photographing method and a related apparatus. An electronic device may determine a flicker frequency of an artificial light source, and adjust a frame interval in an image photographing process based on the flicker frequency of the artificial light source. Optical signals corresponding to times at which different frames of images start exposure have a same phase. Further, the electronic device can reduce an exposure time with a small step size and increase an ISO with a small step size, so that it is possible to not only maintain appropriate brightness of an image but also reduce occurrences of a motion blur in the image. The method can not only reduce occurrences of scrolling bright and dark streaks in captured images, but also avoid a large quantity of noise caused by a drastic change in ISO in the captured images.

According to a first aspect, this application provides a photographing method. The method includes the following steps: An electronic device displays a photographing interface on a display, where the photographing interface is configured to display a first image captured by a camera. If a relative motion exists between a photographed subject in the first image and the electronic device, the electronic device sequentially displays L image frames captured by the camera at the photographing interface, where exposure times of the L image frames are different and sequentially decreased, an exposure time of an image frame first displayed in the L image frames is the same as an exposure time of the first image, and L is an integer greater than 2. If an artificial light source is present in a photographing environment, the electronic device determines a flicker period of the artificial light source. The electronic device adjusts, based on the flicker period, a frame interval for photographing the L image frames, where the frame interval is an interval between photographing two adjacent frames of images in the L image frames by the camera, and the frame interval is an integer multiple of the flicker period.

In the solution provided in this application, the electronic device may reduce the exposure time with a smaller step size, so that the ISO does not increase significantly in a short time. A higher ISO results in a larger quantity of noise in the image. Therefore, the method can avoid that a large quantity of noise appears in an image because the electronic device is incapable of reducing the noise in a timely manner, in other words, the user can obtain an image of higher quality. In addition, the electronic device can adjust the frame interval based on the flicker frequency of the artificial light source in the photographing environment, so that scrolling bright and dark streaks in images can no longer scroll, thereby improving user experience in scenarios such as preview and video recording.

With reference to the first aspect, in a possible implementation of the first aspect, ISOs of the L image frames are different and sequentially increased; exposure intensities of the L image frames are the same as an exposure intensity of the first image; and the exposure intensity is used to represent an exposure.

In the solution provided in this application, after the electronic device adjusts the frame interval and the exposure time, the ISO used in obtaining the image is gradually increased by a small magnitude. In other words, the ISO is not increased significantly in a short time. A higher ISO results in a larger quantity of noise in the image. Therefore, the method can avoid that a large quantity of noise appears in an image because the electronic device is incapable of reducing the noise in a timely manner, in other words, the user can obtain an image of higher quality.

With reference to the first aspect, in a possible implementation of the first aspect, the electronic device determines a first exposure time, where the first exposure time is an exposure time used by the camera to photograph a second image. The electronic device determines a second exposure time based on the first exposure time, where the second exposure time is an expected exposure time for the camera to photograph a third image, the first exposure time is greater than the second exposure time, and a difference between the first exposure time and the second exposure time is a first step size. The electronic device determines an expected ISO based on the second exposure time. The electronic device determines whether the expected ISO is greater than a preset threshold. If the expected ISO is greater than the preset threshold, the electronic device determines the first exposure time as an exposure time used by the camera to photograph the third image. If the expected ISO is not greater than the preset threshold, the electronic device determines the second exposure time as an exposure time used by the camera to photograph the third image. The second image is the first image and the third image is the image frame first displayed in the L image frames; or the second image and the third image are two adjacent image frames in the L image frames.

In the solution provided in this application, the L image frames may be images obtained when the electronic device is reducing the exposure time, or may be images obtained after the exposure time of the electronic device has been reduced to a stable value. It may be understood that, when reducing the exposure time, the electronic device needs to determine whether a corresponding ISO is greater than the preset threshold, because an increased ISO not only amplifies a wanted signal but also amplifies noise. Therefore, a higher ISO indicates a larger quantity of noise in the image obtained by the electronic device 100 and poorer quality of the image. In the method, the electronic device sets a reasonable range for the ISO, so that the wanted signal is amplified while the amplified noise is also within a noise reduction capability range of the electronic device 100.

With reference to the first aspect, in a possible implementation of the first aspect, the first step size is less than the flicker period.

In the solution provided in this application, the electronic device may reduce the exposure time with a smaller step size, so that the ISO does not increase significantly in a short time. For example, a step size (first step size) for the electronic device to reduce the exposure time may be less than the flicker period. It may be understood that a higher ISO results in a larger quantity of noise in the image. Therefore, the method can avoid that a large quantity of noise appears in an image because the electronic device is incapable of reducing the noise in a timely manner, in other words, the user can obtain an image of higher quality.

With reference to the first aspect, in a possible implementation of the first aspect, before the electronic device sequentially displays the L image frames captured by the camera at the photographing interface, the method further includes the following steps: The electronic device obtains R image frames acquired by the camera, where the R image frames include the first image, each of the R image frames includes the photographed subject, and R is an integer greater than 2. The electronic device determines, by determining whether a location of the photographed subject changes in two adjacent image frames in the R image frames, whether a relative motion exists between the photographed subject in the first image and the electronic device. A relative motion exists between the photographed subject in the first image and the electronic device if there are pixels of which velocity variations are inconsistent in a two-dimensional velocity vector field.

In the solution provided in this application, the electronic device needs to determine whether a relative motion exists between the photographed subject and the electronic device, and then the electronic device performs corresponding processing based on a determining result. For example, if the electronic device determines that the relative motion exists between the photographed subject and the electronic device, the electronic device may reduce the exposure time to attenuate a motion blur to obtain a clearer image.

With reference to the first aspect, in a possible implementation of the first aspect, the electronic device performs motion blur detection on the L image frames and determines a value of L based on a result of the motion blur detection. A motion blur exists in an $(L-1)^{th}$ image frame in the L image frames; and no motion blur exists in an $L^{th}$ image frame in the L image frames.

In the solution provided in this application, the electronic device can perform motion blur detection on the obtained image, and the electronic device does not need to reduce the exposure time when the motion blur has been eliminated. Compared with the manner in which the exposure time is gradually reduced until a corresponding ISO approaches the preset threshold, the manner of motion blur detection can reduce time and computational resources, so that a user can obtain a stable and high-quality image in a shorter time, thereby improving user experience.

With reference to the first aspect, in a possible implementation of the first aspect, after the electronic device adjusts, based on the flicker period, the frame interval for photographing the L image frames, the method further includes the following steps: The electronic device detects a first user operation. The electronic device saves, as a video, K image frames that are captured by the camera and that are displayed at the photographing interface. A frame interval of the K image frames is the same as the frame interval of the L image frames, and an exposure time of any one of the K image frames is the same as an exposure time of an image frame last displayed in the L image frames. It may be understood that K may be a positive integer.

In the solution provided in this application, the electronic device may start to adjust the exposure time at the time of preview, so that the user can obtain a higher quality image at the time of subsequent photographing or recording.

With reference to the first aspect, in a possible implementation of the first aspect, the electronic device obtains H image frames captured by the camera, and the electronic device saves the H image frames as a video, where the H image frames include the L image frames or one or more of the L image frames. It may be understood that H may be a positive integer.

In the solution provided in this application, the electronic device may adjust the exposure time during the recording, so that the user can obtain a higher quality video.

According to a second aspect, this application provides an electronic device including a display, a camera, one or more memories, one or more processors. The one or more processors are coupled to the camera and the one or more memories. The one or more memories are configured to store computer program code including computer instructions. The display may be configured to display a photographing interface, where the photographing interface is configured to display a first image captured by the camera. The display is further configured to sequentially display, if a relative motion exists between a photographed subject in the first image and the electronic device, L frames of second images captured by the camera at the photographing interface, where exposure times of the L image frames are different and sequentially decreased; an exposure time of an image frame first displayed in the L image frames is the same as an exposure time of the first image; and L is an integer greater than 2. The processor may be configured to determine a flicker period of an artificial light source if the artificial light source is present in a photographing environment. The processor may be further configured to adjust, based on the flicker period, a frame interval for photographing the L image frames, where the frame interval is an interval between photographing two adjacent frames of images in the L image frames by the camera; and the frame interval is an integer multiple of the flicker period.

With reference to the second aspect, in a possible implementation of the second aspect, ISOs of the L image frames are different and sequentially increased; exposure intensities of the L image frames are the same as an exposure intensity of the first image; and the exposure intensity is used to represent an exposure.

With reference to the second aspect, in a possible implementation of the second aspect, the processor may be further configured to determine a first exposure time, where the first exposure time is an exposure time used by the camera to photograph a second image; and determine a second exposure time based on the first exposure time, where the second exposure time is an expected exposure time for the camera to photograph a third image; the first exposure time is greater than the second exposure time; and a difference between the first exposure time and the second exposure time is a first step size. The processor may further determine an expected ISO based on the second exposure time and determine whether the expected ISO is greater than a preset threshold. If the expected ISO is greater than the preset threshold, the processor determines the first exposure time as an exposure time used by the camera to photograph the third image. If the expected ISO is not greater than the preset threshold, the processor determines the second exposure time as an exposure time used by the camera to photograph the third image. The second image is the first image and the third image is the image frame first displayed in the L image frames; or the second image and the third image are two adjacent image frames in the L image frames.

With reference to the second aspect, in a possible implementation of the second aspect, the first step size is less than the flicker period.

With reference to the second aspect, in a possible implementation of the second aspect, the processor may be further configured to obtain R image frames captured by the camera; where the R image frames include the first image; each of the R image frames includes the photographed subject; and R is an integer greater than 2. The processor may be further configured to determine, by determining whether a location of the photographed subject changes in two adjacent image frames in the R image frames, whether a relative motion exists between the photographed subject in the first image and the electronic device. A relative motion exists between the photographed subject in the first image and the electronic device if there are pixels of which velocity variations are inconsistent in a two-dimensional velocity vector field.

With reference to the second aspect, in a possible implementation of the second aspect, the processor is further configured to perform motion blur detection on the L image frames and determine a value of L based on a result of the motion blur detection. A motion blur exists in an $(L-1)^{th}$ image frame in the L image frames; and no motion blur exists in an $L^{th}$ image frame in the L image frames.

With reference to the second aspect, in a possible implementation of the second aspect, the processor may be further configured to: detect a first user operation; where the first user operation is used to stop recording a video; and save, as a video, K image frames that are captured by the camera and that are displayed at the photographing interface. A frame interval of the K image frames is the same as the frame interval of the L image frames; and an exposure time of any one of the K image frames is the same as an exposure time of an image frame last displayed in the L image frames. It may be understood that K may be a positive integer.

With reference to the second aspect, in a possible implementation of the second aspect, the processor is further configured to obtain H image frames captured by the camera; and save the H image frames as a video; where the H image frames include the L image frames or one or more of the L image frames. It may be understood that H may be a positive integer.

According to a third aspect, this application provides a computer-readable storage medium including instructions. When the instructions are run on an electronic device, the electronic device is enabled to perform any one of the possible implementations of the first aspect.

According to a fourth aspect, an embodiment of this application provides a chip, the chip is applied to an electronic device and includes one or more processors, and the processor is configured to invoke computer instructions, so that the electronic device is enabled to perform any one of the possible implementations of the first aspect.

According to a fifth aspect, an embodiment of this application provides a computer program product including instructions; and when the computer program product is run on a device, the electronic device is enabled to perform any one of the possible implementations of the first aspect.

It may be understood that the electronic device provided in the second aspect, the computer-readable storage medium provided in the third aspect, the chip provided in the fourth aspect, and the computer program product provided in the fifth aspect are all used to perform the method provided in the embodiments of this application. Therefore, for beneficial effects that can be achieved, refer to the beneficial effects in the corresponding method. Details are not described herein again.

BRIEF DESCRIPTION OF THE DRAWINGS

FIG. 3A is a waveform diagram of an optical signal according to an embodiment of this application;

FIG. 3B is a waveform diagram of another optical signal according to an embodiment of this application;

DETAILED DESCRIPTION OF ILLUSTRATIVE EMBODIMENTS

Figure 1:
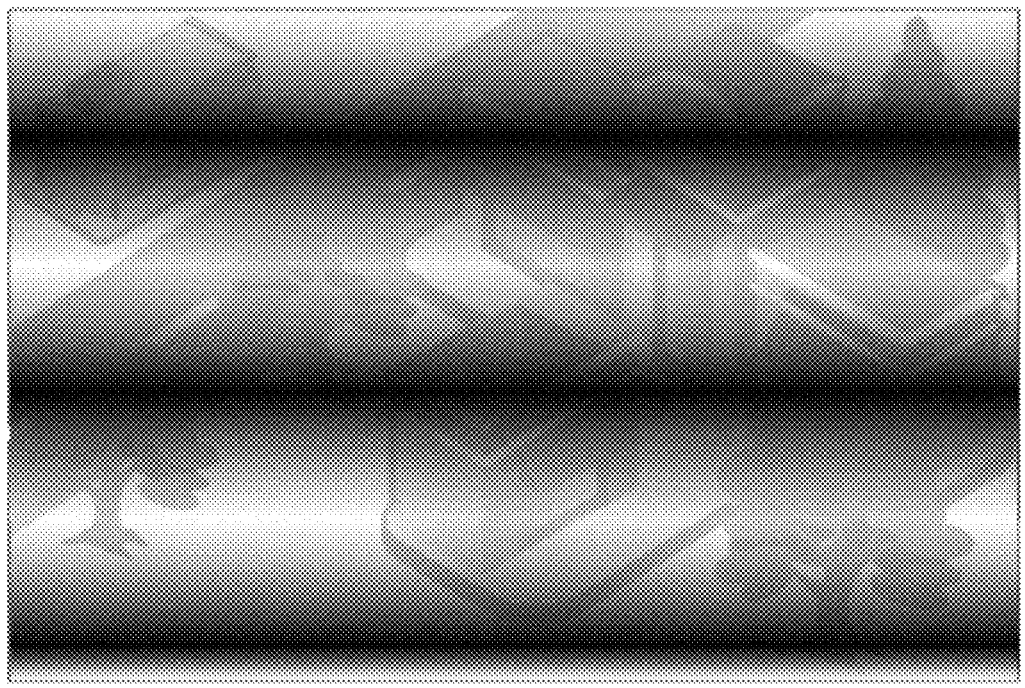
FIG. 1 is a schematic diagram of a banding phenomenon according to an embodiment of this application.

The following clearly describes the technical solutions in embodiments of this application with reference to the accompanying drawings in the embodiments of this application. In descriptions of the embodiments of this application, unless otherwise stated, "/" indicates or, for example, A/B may indicate A or B. "And/or" in the text is merely used to describe an association relationship between associated objects, and indicates that three relationships may exist. For example, A and/or B may indicate that there are three cases: Only A exists, both A and B exist, and only B exists. In addition, in the descriptions of embodiments of this application, "a plurality of" means two or more.

It should be understood that the terms "first" and "second" in the specification, claims, and accompanying drawings of this application are used to distinguish different objects, and are not used to describe a specific sequence. In addition, the terms "include" and "have" and any variations thereof are intended to cover non-exclusive inclusion. For example, a process, method, system, product, or device that includes a series of steps or units is not limited to a listed step or unit, but optionally further includes an unlisted step or unit, or optionally further includes another step or unit inherent to the process, method, product, or device.

An "embodiment" in this application means that a specific feature, structure, or characteristic described with reference to the embodiment may be included in at least one embodiment of this application. The phrase appearing at various locations in the specification does not necessarily refer to a same embodiment, nor is a separate or alternative embodiment mutually exclusive with another embodiment. A person skilled in the art explicitly and implicitly understand that the embodiments described in this application may be combined with another embodiment.

This application relates to the field of photographing. To facilitate understanding of the method provided in this application, some terms in the field of photographing are described below.

1. Exposure

The exposure reflects an amount of light energy obtained by a photosensitive element when obtaining an image, and affects brightness of the final obtained image. A larger exposure for photographing one frame of image indicates higher brightness of this frame of image.

The exposure is determined by three major factors: an exposure time, a light-through area, and an ambient light intensity. The exposure time is determined by a shutter speed. The light-through area is determined by an aperture size. In the film age, a sensitivity of a film to light is reflected by a light sensitivity ISO, which can be considered to affect the ambient light intensity obtained by the photosensitive element. However, a photosensitive element in electronic devices such as a digital camera and a mobile phone remains unchanged after packaging. For these electronic devices, the ISO indicates no longer a sensitivity of the photosensitive element to light, but an amplification gain value of an electronic signal. A higher ISO indicates a larger amplification gain of the electronic signal, a larger original signal, and a brighter image.

In summary, the exposure time, the aperture size, and the ISO are three major factors that affect image brightness.

2. Exposure Intensity

In some embodiments, an aperture size of an electronic device such as a digital camera or a mobile phone is fixed, and the electronic device may adjust image brightness by adjusting an exposure time and an ISO. For ease of understanding and calculation, the exposure intensity is used to represent image brightness in subsequent embodiments of this application. A larger exposure intensity indicates a brighter image, while a smaller exposure intensity indicates a darker image. The electronic device may adjust the exposure intensity by adjusting the exposure time and the ISO. Specifically, the exposure intensity, the exposure time, and the ISO may have the following relationship: Exposure intensity=Exposure time*ISO.

3. Scrolling Streak Phenomenon

When an artificial light source is present in a photographing scenario, scrolling streak lines may appear in captured images (banding phenomenon for short). In other words, scrolling bright and dark streaks may appear in preview images on an electronic device such as a camera or a mobile phone. FIG. 1 illustrates an image obtained by an electronic device when an artificial light source is present in a photographing environment. It can be seen that FIG. 1 is not uniform in brightness and includes bright and dark streaks.

Causes of the banding phenomenon are described below.

In one aspect, description is given from the perspective of the artificial light source.

Figure 2B:
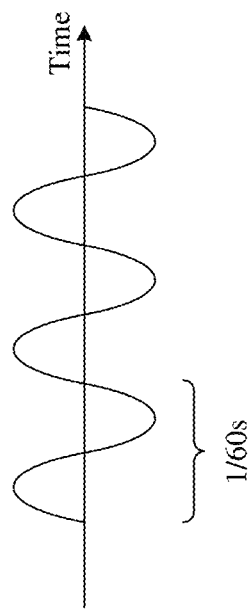
FIG. 2B is a waveform diagram of another alternating current according to an embodiment of this application.
Figure 2A:
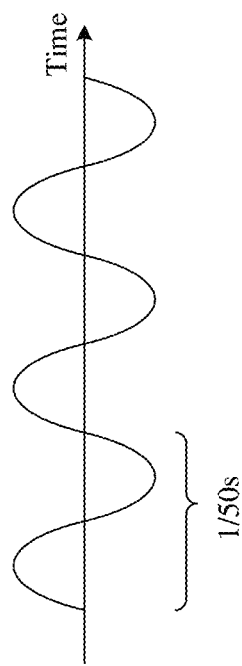
FIG. 2A is a waveform diagram of an alternating current according to an embodiment of this application.

In daily life, alternating currents in sinusoidal waveforms are usually used. FIG. 2A illustrates an example waveform diagram of an alternating current at a frequency of 60 Hertz (Hz) for a power supply. FIG. 2B illustrates an example waveform diagram of an alternating current at a frequency of 50 Hz for a power supply.

When the artificial light source is powered by an alternating current, the artificial light source converts an electrical signal into an optical signal. Because the electrical signal is a periodic signal at a specific frequency, the optical signal obtained after conversion is also a periodic signal at a specific frequency. It may be understood that lights emitted by the artificial light source vary with time in frequency and period, that is, a stroboscopic flash phenomenon occurs.

It may be understood that the stroboscopic flash phenomenon is caused by a design of the power supply and a characteristic of the artificial light source. Therefore, no stroboscopic flash does not exist in practice. For many lighting fixtures, an operating current will certainly fluctuate with fluctuation of an input voltage, and this directly causes fluctuation of a light output to generate a stroboscopic flash.

However, light energy emitted by the artificial light source is not directional, so that a waveform of the optical signal is no longer a sinusoidal waveform, but an envelope at a frequency of 100 Hz or 120 Hz. Specifically, as shown in FIG. 3A, when the artificial light source is powered by an alternating current of 60 Hz, the waveform of the optical signal obtained after conversion by the artificial light source is a periodic envelope at a frequency of 120 Hz. As shown in FIG. 3B, when the artificial light source is powered by an alternating current of 50 Hz, the waveform of the optical signal obtained after conversion by the artificial light source is a periodic envelope at a frequency of 100 Hz.

It can be learned that a flicker frequency of an artificial light source is usually twice a frequency of an alternating current powering the artificial light source. The flicker frequency of the artificial light source is not limited in the embodiment of this application. For example, the frequency of the alternating current powering the artificial light source is a frequency other than 50 Hz or 60 Hz, and the flicker frequency of the artificial light source may be a value other than 100 Hz or 120 Hz.

In another aspect, description is given from the perspective of the photographing electronic device.

Currently, a rolling shutter (Rolling Shutter) is usually used for an electronic device such as a digital camera or a mobile phone, and an exposure mode for the rolling shutter is row-by-row exposure.

Figure 4:
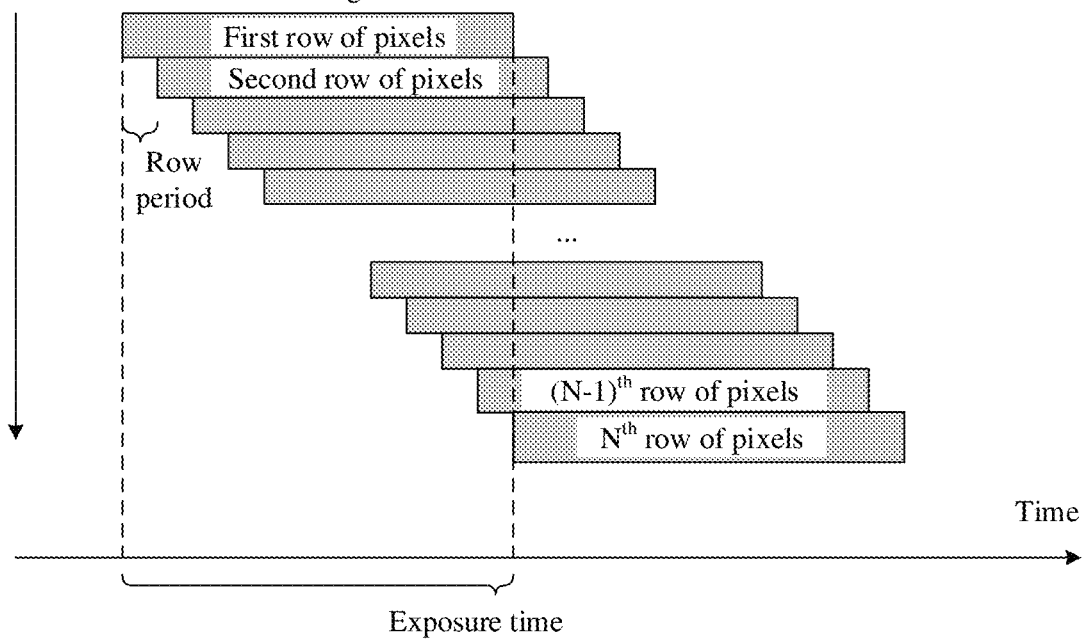
FIG. 4 is a schematic diagram illustrating an exposure principle of a sensor according to an embodiment of this application.

Specifically, as shown in FIG. 4, a sensor (for example, a CMOS image sensor) starts exposing a first row of pixels in a frame of image, and starts exposing a second row of pixels after an interval of one row period. By analogy, after exposure of an $(N-1)^{th}$ row of pixels is started, exposure of an $N^{th}$ row of pixels is started after an interval of one row period. That is, a difference between a time at which each row of pixels starts exposure and a time at which the next row of pixels starts exposure is one row period. Therefore, each row of pixels starts exposure at different times.

In this application, the exposure time is a time required for the electronic device to expose a row of pixels in a frame of image. Different rows of pixels in a same frame of image usually have a same exposure time.

It may be understood that the row period may be determined by a capability of the sensor. Different sensors may have different row periods, so that different electronic devices may also have different row periods. A value of the row period is not limited in the embodiment of this application.

It may be understood that in the schematic diagram (for example, FIG. 3A or FIG. 3B) of the optical signal obtained after conversion by the artificial light source, an area enclosed by the envelope and the X-axis over a period of time (a definite integral of a function corresponding to the envelope over this period of time) is light energy emitted by the artificial light source over this period of time, in other words, the light energy received by the sensor over this period of time.

If the $N^{th}$ row of pixels starts exposure at $T_1$ and ends exposure at $T_2$, the light energy received by the sensor over this period of time from $T_1$ to $T_2$ affects brightness of the $N^{th}$ row of pixels in the final displayed image. A larger amount of light energy received by the sensor from $T_1$ to $T_2$ indicates higher brightness of the $N^{th}$ row of pixels in the final displayed image. A smaller amount of light energy received by the sensor from $T_1$ to $T_2$ indicates lower brightness of the $N^{th}$ row of pixels in the final displayed image.

The following is described by taking an example in which an artificial light source powered by an alternating current of 50 Hz is present in a photographing environment.

Figure 5:
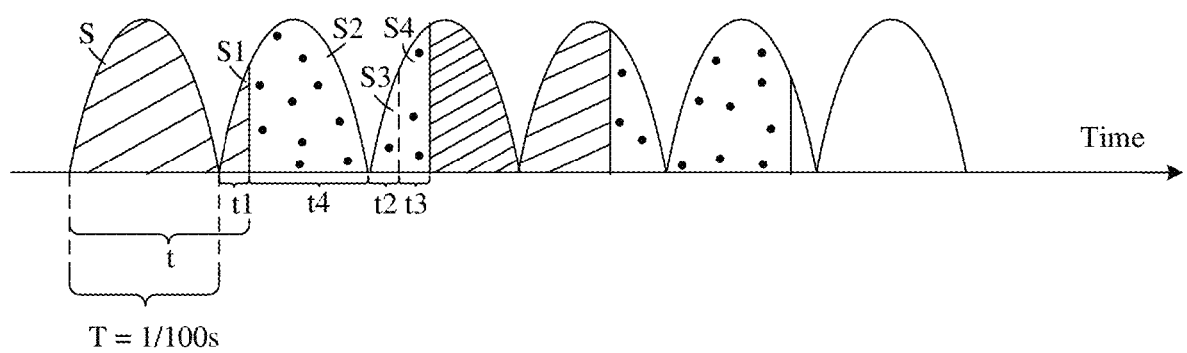
FIG. 5 is a waveform diagram of another optical signal according to an embodiment of this application.

As shown in FIG. 5, when the artificial light source is powered by the alternating current of 50 Hz, a waveform of an optical signal obtained after conversion by the artificial light source is a periodic envelope at a frequency of 100 Hz. A flicker period of the artificial light source is denoted as T, and T=1/loos. An exposure time in this case is t, that is, $T_2-T_1=t$. In other words, a time required for the sensor to expose each row in a frame of image is t. As can be seen from FIG. 5, t=T+t1. If t is not an integer multiple of the flicker period T, when the sensor exposes an $i^{th}$ row of pixels in the image, light energy received by the row of pixels is S+S1, where S may represent light energy received by the row of pixels within the time T, and S1 may represent light energy received by the row of pixels within the time t1. As can be seen from FIG. 5, t4+t2+t3=t. When the sensor exposes an $(i+1)^{th}$ row of pixels in the image, light energy received by the $(i+1)^{th}$ row of pixels is S2+S3+S4. Because t1=t2=t3, S1=S3<S4. Obviously, S2+S3=S. Therefore, the light energy received by the $(i+1)^{th}$ row of pixels is more than the light energy received by the $i^{th}$ row of pixels. In other words, the $i^{th}$ row of pixels and the $(i+1)^{th}$ row of pixels in the final displayed image are different in brightness. The $(i+1)^{th}$ row of pixels is brighter than the $i^{th}$ row of pixels.

It may be understood that because the optical signal obtained after conversion by the artificial light source is a periodic signal, at any start time, when $T_2-T_1=M*T$ (M is a positive integer) and M remains unchanged, light energy received by the sensor from $T_1$ to $T_2$ remains unchanged, and different rows of pixels in the final displayed image are same in brightness; or at any start time, when $T_2-T_1=M*T$ (M is not a positive integer) and M remains unchanged, light energy received by the sensor from $T_1$ to $T_2$ does not necessarily remain unchanged (as shown in FIG. 5), and different rows of pixels in the final displayed image are not necessarily the same in brightness, in other words, the final displayed image may have bright and dark streaks. In summary, if the exposure time is an integer multiple of the flicker period of the artificial light source, the image displayed by the electronic device does not have bright and dark streaks. If the exposure time is not an integer multiple of the flicker period of the artificial light source, the image displayed by the electronic device will have bright and dark streaks. Because the bright and dark streaks in different images may change in location, scrolling bright and dark streaks may appear in preview images or video images of the electronic device, in short, the banding phenomenon.

It should be noted that if optical signals corresponding to times at which the first rows of pixels in different images start exposure have a same phase, bright and dark streaks still appear in preview images on an electronic device such as a digital camera or a mobile phone. However, because the phase at the time at which the first row in each frame of image starts exposure remains the same, when the images are exposed by the sensor in these electronic devices, a magnitude relationship of the received light energy between different rows in each frame of image remains the same. Therefore, the light energy received by the $N^{th}$ row in each frame of image may be different from each other, in other words, the $N^{th}$ row of pixels in each frame of image may be different from each other in brightness, but remain unchanged in brightness relative to other rows of pixels in the same image.

4. Motion Blur

It may be understood that when a subject or a person in motion is photographed, if the subject or the person moves excessively fast, and an exposure time used by the electronic device to photograph an image is excessively long, the captured image is likely to have a motion blur. The motion blur is a moving effect in a scene image, and is usually caused by a relative motion between a photographing device and a photographed subject. The motion blur may cause apparent blurred drag traces in the obtained image.

Figure 6:
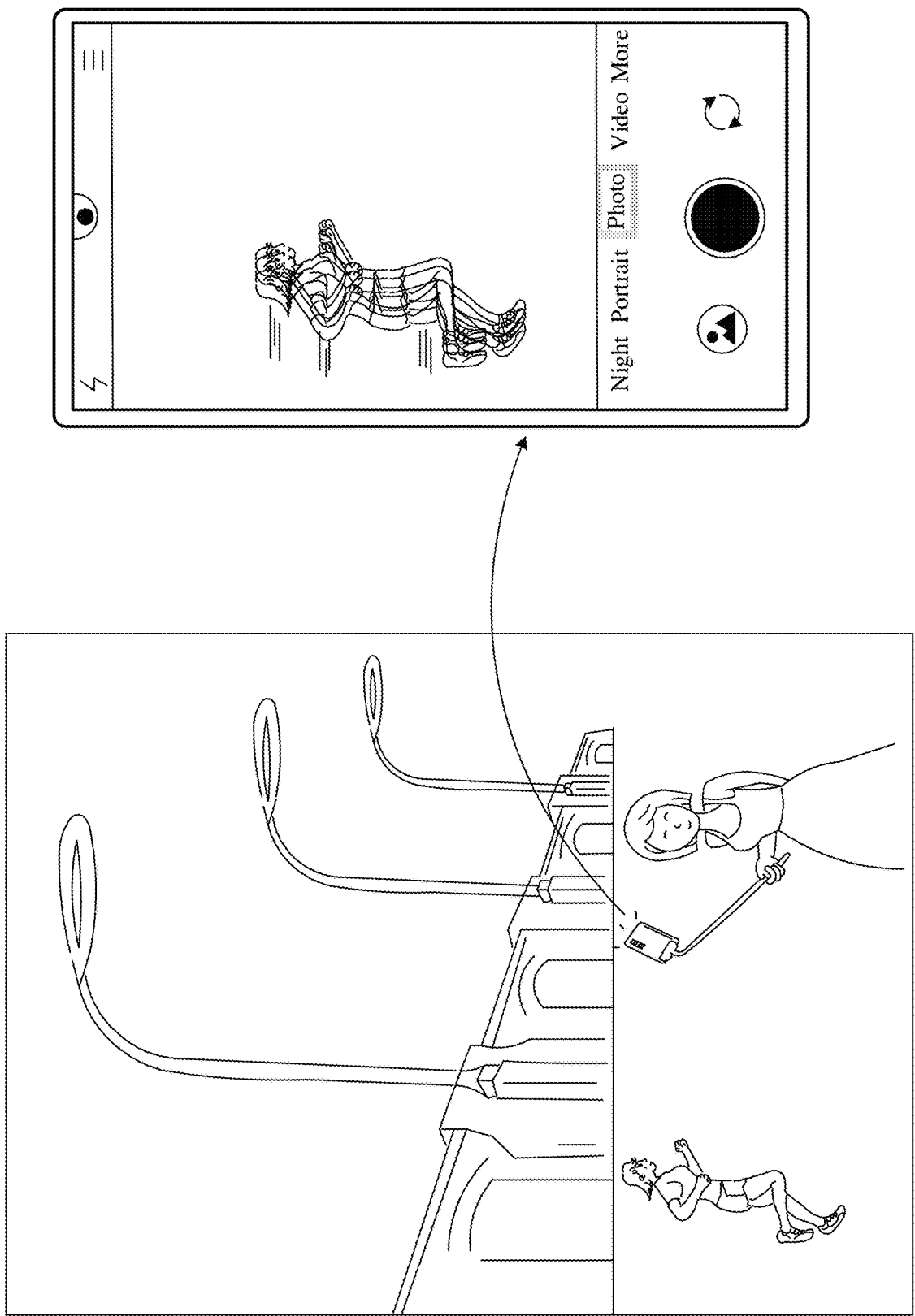
FIG. 6 is a schematic diagram of a sports scenario in which an artificial light source is present according to an embodiment of this application.

As shown in FIG. 6, when a user uses an electronic device to photograph a subject running under a streetlight, the user finds that the photographed subject displayed on the electronic device is blurred. In this case, no clear image or video can be obtained by photographing. It may be understood that the photographed subject is an object being photographed by a photographing device such as a digital camera or a mobile phone.

The electronic device may usually take a method for reducing an exposure time to attenuate the motion blur. A shorter exposure time for photographing a frame of image indicates a smaller displacement of the photographed subject during photographing the frame of image. In this way, it is possible to reduce blurred drag traces caused by movement of the photographed subject in a frame of captured image, thereby obtaining a clearer image.

If a subject or a person taking a relative motion is photographed in a scenario in which an artificial light source is present, to avoid the banding phenomenon, an exposure time needs to meet a condition that the exposure time is an integer multiple of the flicker period of the artificial light source. To be specific, not only an original exposure time is an integer multiple of the flicker period of the artificial light source, but a step size for reducing the exposure time is also set to an integer multiple of the flicker period. It may be understood that the original exposure time refers to an initial value of the exposure time, in other words, the exposure time gradually decreases from the original exposure time.

Because an exposure determines whether an image is bright or dark (brightness), the exposure remains unchanged to ensure that the image brightness does not change. Accordingly, an exposure intensity does not change. According to the relationship among the exposure intensity, the exposure time, and the ISO (Exposure intensity=Exposure time*ISO), the ISO changes accordingly when the exposure intensity is unchanged but the exposure time changes. As the exposure time gradually decreases, a smaller difference between the exposure time and the flicker period indicates a greater change in the ISO.

The following is described by taking an example of an artificial light source with a flicker frequency of 100 Hz. When the flicker frequency of the artificial light source is 100 Hz, a flicker period of the artificial light source is 10 ms, in other words, a step size of 10 ms is used to reduce the exposure time. Because the exposure time needs to meet the condition that the exposure time is an integer multiple of the flicker period of the artificial light source, the exposure time is at least 10 ms.

If the original exposure time is 30 ms and the ISO is 400, the exposure time is reduced from the original exposure time, specifically, from 30 ms to 20 ms and then to 10 ms. The ISO is increased from 400 to 600 and then to 1200 without changing the image brightness, and it can be learned that the ISO changes greatly.

Because the ISO represents the amplification gain of the electronic signal, the increased ISO essentially amplifies an output signal of the sensor. The output signal of the sensor includes a wanted signal as well as noise. Therefore, the increased ISO amplifies both the wanted signal and the noise. In other words, a higher ISO indicates a larger quantity of noise in the image and poorer image quality.

To ensure quality of the obtained image, during increasing the ISO, the electronic device may adjust a noise reduction parameter based on the change in ISO, and reduce an impact of the ISO on the image quality.

However, when the ISO changes excessively fast or an amount of change is excessively large, the electronic device may not be able to adjust the noise reduction parameter in a timely manner, resulting in an abrupt noise change in the image. In addition, because the noise reduction parameter cannot be adjusted in a timely manner, a signal-to-noise ratio decreases, and the electronic device may have an error in an algorithm result, for example, an automatic white balance (Automatic white balance, AWB), obtained by calculation by using a statistical value. For example, when the electronic device calculates color information, the noise ratio is so large that little useful information can be utilized, resulting in an abnormal color change of the image.

This application provides a photographing method and a related apparatus. An electronic device may determine a flicker frequency of an artificial light source, and adjust a frame interval in an image photographing process based on the flicker frequency of the artificial light source. Optical signals corresponding to times at which different frames of images start exposure have a same phase. Further, the electronic device can reduce an exposure time with a small step size and increase an ISO with a small step size, so that it is possible to not only maintain appropriate brightness of an image but also reduce occurrences of a motion blur in the image. The method can not only reduce occurrences of scrolling bright and dark streaks in captured images, but also avoid a large quantity of noise caused by a drastic change in ISO in the captured images.

The following describes an apparatus related in the embodiments of this application.

Figure 7:
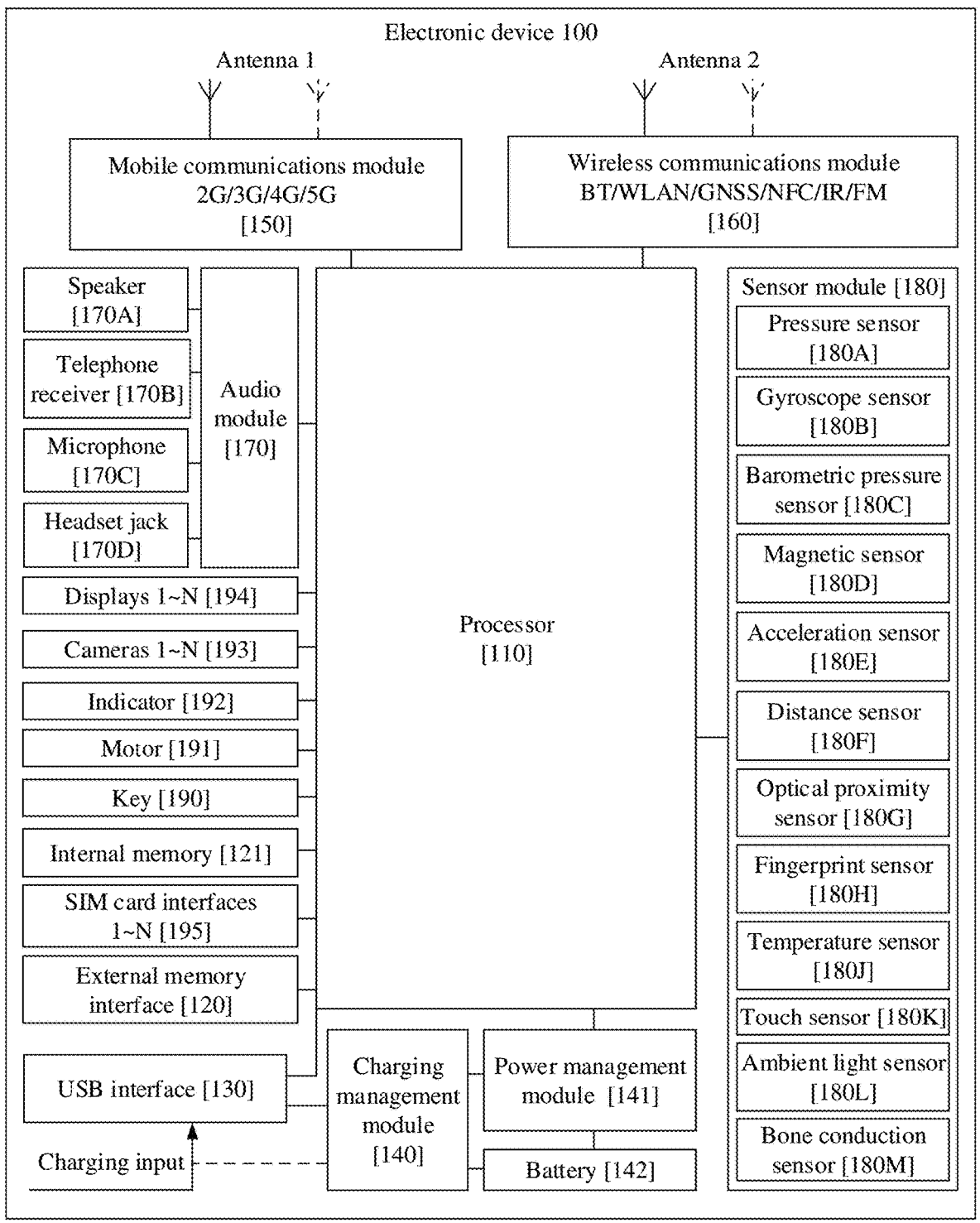
FIG. 7 is a schematic diagram of a hardware structure of an electronic device 100 according to an embodiment of this application.

FIG. 7 is a schematic diagram of a hardware structure of an electronic device 100 according to an embodiment of this application.

The electronic device 100 may include a processor 110, an external memory interface 120, an internal memory 121, a universal serial bus (Universal Serial Bus, USB) interface 130, a charging management module 140, a power management unit 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the structure illustrated in this embodiment of the present invention constitutes no specific limitation on the electronic device 100. In some other embodiments of this application, the electronic device 100 may include more or fewer components than those shown in the figure, or may combine some components, or may split some components, or may have different component arrangements. The illustrated components may be implemented by hardware, software, or a combination of software and hardware.

The processor 110 may include one or more processing units. For example, the processor 110 may include an application processor (Application Processor, AP), a modem processor, a graphics processing unit (Graphics Processing unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be separate components, or may be integrated into one or more processors.

The controller may be a nerve center and a command center of the electronic device 100. The controller may generate an operation control signal based on instruction operation code and a time sequence signal, and complete control of instruction fetching and instruction execution.

It may be understood that the processor 110 may further include an AE system. The AE system may be specifically disposed in the ISP. The AE system can be configured to automatically adjust exposure parameters. Alternatively, the AE system may be integrated into another processor chip. This is not limited in the embodiments of this application.

In the embodiment provided in this application, the electronic device 100 may perform the method for adjusting an exposure intensity by using the processor 110.

The processor 110 may further be provided with a memory for storing an instruction and data. In some embodiments, the memory in the processor 110 is a cache. The memory may store instructions or data recently used or repeatedly used by the processor 110. If the processor 110 needs to use the instructions or the data again, the processor 110 may directly invoke the instructions or the data from the memory, to avoid repeated access and reduce waiting time of the processor 110. This improves system efficiency.

In some embodiments, the processor 110 may include one or more interfaces. The USB interface 130 is an interface that complies with the USB standard specification, and specifically may be a mini USB interface, a micro USB interface, a USB type C interface, or the like. The USB interface 130 may be configured to connect to a charger to charge the electronic device 100, or may be used for data transmission between the electronic device 100 and a peripheral device, or may be configured to connect to a headset to play audio by using a headset. The interface may be further configured to connect to another electronic device 100, for example, an AR device.

The charging management module 140 is configured to receive a charging input from the charger. When charging the battery 142, the charging management module 140 may further supply power to the electronic device 100 by using the power management module 141.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

The wireless communications function of the electronic device 100 can be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed to increase antenna utilization.

The mobile communications module 150 may provide a wireless communications solution including 2G/3G/4G/5G and the like to be applied to the electronic device 100. The mobile communications module 150 may include at least one filter, at least one switch, at least one power amplifier, at least one low noise amplifier (Low Noise Amplifier, LNA), and the like. The mobile communications module 150 may receive an electromagnetic wave by using the antenna 1, perform processing such as filtering and amplification on the received electromagnetic wave, and send the processed electromagnetic wave to the modem processor for demodulation. The mobile communications module 150 may further amplify a signal modulated by the modem processor, and convert the signal into an electromagnetic wave by using the antenna 1 for radiation.

The modem processor may include a modulator and a demodulator. The modulator is configured to modulate a to-be-sent low-frequency baseband signal into a medium or high frequency signal. The demodulator is configured to demodulate a received electromagnetic wave signal into a low-frequency baseband signal. The demodulator then transfers the demodulated low-frequency baseband signal to the baseband processor for processing. The low-frequency baseband signal is processed by the baseband processor and then transferred to the application processor. The application processor outputs a sound signal by using an audio device (which is not limited to the speaker 170A, the telephone receiver 170B, and the like), or displays an image or a video on the display 194.

The wireless communications module 160 may provide a solution to wireless communications including a wireless local area network (Wireless Local Area Networks, WLAN) (such as a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication (Near Field Communication, NFC) technology, an infrared (Infrared, IR) technology, and the like applied to the electronic device 100. The wireless communications module 160 may be one or more components integrating at least one communications processor module. The wireless communications module 160 receives an electromagnetic wave by using the antenna 2, modulates and filters an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology.

The electronic device 100 implements a display function by using the GPU, the display 194, the application processor, and the like. The GPU is an image processing microprocessor and is connected to the display 194 and the application processor. The GPU is configured to perform mathematical and geometric calculations, and is configured to render graphics. The processor 110 may include one or more GPUs, and the one or more GPUs execute a program instruction to generate or change display information.

The display 194 is configured to display an image, a video, or the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a mini LED, a micro LED, a micro OLED, a quantum dot light emitting diode (Quantum Dot Light Emitting Diodes, QLED), or the like. In some embodiments, the electronic device 100 may include 1 or N displays 194, where N is a positive integer greater than 1.

The electronic device 100 may implement a capturing function by using the ISP, the camera 193, the video codec, the GPU, the display 194, the application processor, and the like.

The ISP is configured to process data fed back by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, to convert the electrical signal into an image or a video visible to the naked eye. The ISP may also perform algorithm optimization on noise, brightness, and skin tone of an image. The ISP may also optimize parameters such as exposure and color temperature of a photographing scenario. In some embodiments, the ISP may be disposed in the camera 193.

The camera 193 is configured to capture a still image or a video. An optical image is generated for an object through the lens and is projected to the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP that converts the electrical signal into a digital image or a video signal. The ISP outputs the digital image or the video signal to the DSP for processing. The DSP converts the digital image or the video signal into an image or a video signal in a standard format, such as RGB or YUV. In some embodiments, the electronic device 100 may include 1 or N cameras 193, where N is a positive integer greater than 1. For example, in some embodiments, the electronic device 100 may obtain images of a plurality of exposure coefficients by using the N cameras 193. Further, during video post-processing, the electronic device 100 may composite an HDR image based on the images of the plurality of exposure coefficients by using an HDR technology.

The digital signal processor is configured to process a digital signal. In addition to processing a digital image or a video signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 may support one or more types of video codecs. In this way, the electronic device 100 may play or record videos in a plurality of coding formats, such as moving picture experts group (Moving Picture Experts Group, MPEG)1, MPEG2, MPEG3, and MPEG4.

The NPU is a neural-network (Neural-Network, NN) computing processor that processes input information rapidly by referring to a structure of a biological neural network, for example, by referring to a transmission mode between human brain neurons, and can further perform self-learning continuously. Applications like intelligent cognition, such as, image recognition, face recognition, speech recognition, and text understanding, of the electronic device 100, can be implemented by using the NPU.

The external memory interface 120 may be configured to connect to an external memory card, for example, a micro SD card, to expand a storage capacity of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 executes various function applications and data processing of the electronic device 100 by running the instructions stored in the internal memory 121. The internal memory 121 may include a program storage area and a data storage area. The program storage area may store an operating system, an application required by at least one function (for example, a sound play function or an image/video play function), and the like. The data storage area may store data (such as audio data and a phone book) and the like that are created during use of the electronic device 100.

The electronic device 100 can implement audio functions, such as music playing and recording, by using the audio module 170, the speaker 170A, the telephone receiver 170B, the microphone 170C, the headset jack 170D, the application processor, and the like.

The audio module 170 is configured to convert digital audio information into an analog audio signal for outputting, and is further configured to convert an analog audio input into a digital audio signal.

The speaker 170A, also referred to as a "horn", is configured to convert an electrical audio signal into a sound signal.

The telephone receiver 170B, also referred to as an "earpiece", is configured to convert an electrical audio signal into a sound signal.

The microphone 170C, also referred to as a "mic" or "mike", is configured to convert a sound signal into an electrical signal. At least one microphone 170C may be disposed in the electronic device 100.

The headset jack 170D is configured to connect a wired headset.

The sensor module 180 may include one or more sensors, which may be of a same type or different types. It may be understood that the sensor module 180 shown in FIG. 7 is merely an example division manner, and there may be another division manner. This is not limited in this application.

The pressure sensor 180A is configured to sense a pressure signal, and is capable of converting the pressure signal to an electrical signal. In some embodiments, the pressure sensor 180A may be disposed on the display 194. When a touch operation acts on the display 194, the electronic device 100 detects intensity of the touch operation by using the pressure sensor 180A. The electronic device 100 may also calculate a touched location based on a detected signal of the pressure sensor 180A. In some embodiments, touch operations acting on the same touch location but with different touch operation intensities may correspond to different operation instructions.

The gyroscope sensor 180B may be configured to determine a movement posture of the electronic device 100. In some embodiments, the gyroscope sensor 180B may be configured to determine angular velocities of the electronic device 100 around three axes (that is, x, y, and z axes). The gyroscope sensor 180B may be used for image stabilization during photographing.

The barometric pressure sensor 180C is configured to measure barometric pressure. In some embodiments, the electronic device 100 calculates an altitude based on a barometric pressure value measured by the barometric pressure sensor 180C to assist in positioning and navigation.

The magnetic sensor 180D may include a Hall effect sensor. The electronic device 100 may detect an opening state or a closing state of a flip leather case by using the magnetic sensor 180D.

The acceleration sensor 180E may detect acceleration values of the electronic device 100 in all directions (usually in three axes), and may detect a magnitude and a direction of the gravity when the electronic device 100 is still. The acceleration sensor 180E may be further configured to recognize a posture of the electronic device 100, and be applied to switching between landscape orientation and portrait orientation, a pedometer, or another application.

The distance sensor 180F is configured to measure a distance. The electronic device 100 may measure a distance by using an infrared or laser technology. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 uses the photodiode to detect reflected infrared light from a nearby object. When abundant reflected light is detected, it may be determined that an object exists near the electronic device 100. When insufficient reflected light is detected, the electronic device 100 may determine that no object exists near the electronic device 100.

The ambient light sensor 180L is configured to sense ambient light brightness.

The fingerprint sensor 180H is configured to obtain a fingerprint.

The temperature sensor 180J is configured to detect a temperature.

The touch sensor 180K is also called a "touch panel". The touch sensor 180K may be disposed on the display 194. The touch sensor 180K and the display 194 form a touch screen, also referred to as a "touch control screen". The touch sensor 180K is configured to detect a touch operation acting on or near the touch sensor 180K. The touch sensor may pass a detected touch operation to the application processor to determine a touch event type. The display 194 may be configured to provide a visual output related to the touch operation. In some other embodiments, the touch sensor 180K may be alternatively disposed on a surface of the electronic device 100, in a location different from that of the display 194.

In an embodiment of this application, when a user performs time-lapse photographing or burst shooting by using the electronic device 100, a series of images need to be obtained. In a time-lapse photographing or burst shooting scenario, the electronic device 100 may use an AE mode. That is, the electronic device 100 automatically adjusts an AE value. In a process of previewing the series of images, if the user performs a touch operation on the display 194, a touch AE mode may be triggered. In the touch AE mode, the electronic device 100 may adjust brightness of a corresponding location of the display touched by the user, and perform high-weight light measurement. During calculation of average brightness of the image, a weight of the touch region of the user is significantly greater than other regions. Finally, the calculated average brightness of the image is closer to average brightness of the touch region of the user.

The bone conduction sensor 180M may obtain a vibration signal.

The key 190 includes a power on/off key, a volume key, and the like. The key 190 may be a mechanical button, or may be a touch key. The electronic device 100 may receive a key input and generate a key signal input related to user setting and function control of the electronic device 100.

The motor 191 may generate a vibration alert. The motor 191 may be used for a vibration alert for an incoming call, and may also be used for touch vibration feedback. For example, touch operations on different applications (such as photographing and audio playing) may correspond to different vibration feedback effects. For touch operations performed in different regions of the display 194, the motor 191 may also correspond to different vibration feedback effects. Different application scenarios (for example, a time reminder, receiving information, an alarm clock, and a game) may also correspond to different vibration feedback effects. The touch vibration feedback effect may also be customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or pulled out of the SIM card interface 195 to achieve contact with or separation from the electronic device 100. The electronic device 100 may support 1 or N SIM card interfaces, where N is a positive integer greater than 1. The electronic device 100 interacts with a network by using a SIM card, to implement functions such as a call and data communication. In some embodiments, the electronic device 100 uses eSIM, that is, an embedded SIM card. The eSIM card may be embedded in the electronic device 100 and cannot be separated from the electronic device 100.

Figure 8:
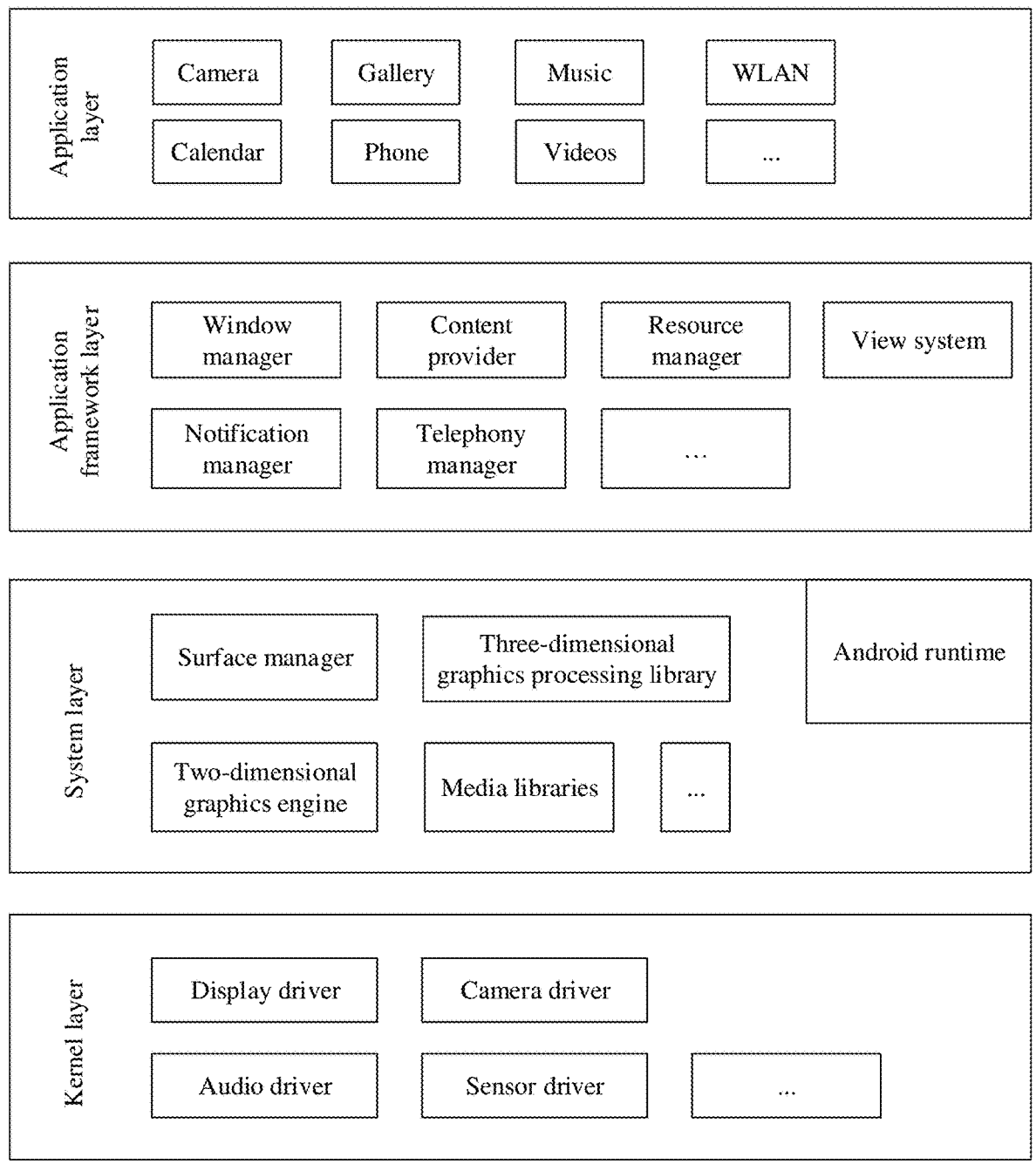
FIG. 8 is a schematic diagram of a software structure of an electronic device 100 according to an embodiment of this application.

FIG. 8 is a schematic diagram of a hardware structure of an electronic device 100 according to an embodiment of this application.

A layered architecture divides software into several layers, and each layer has a clear role and task. The layers communicate with each other through a software interface. In some embodiments, a system is divided into four layers: an application layer, an application framework layer, runtime (Runtime) and system libraries, and a kernel layer from top to bottom.

The application layer may include a series of application program packages.

As shown in FIG. 8, the application program packages may include application programs (also referred to as applications) such as camera, photos, calendar, phone, maps, navigation, WLAN, Bluetooth, music, videos, and SMS messages.

The application framework layer provides an application programming interface (Application Programming Interface, API) and a programming framework for application programs at the application layer. The application framework layer includes some predefined functions.

As shown in FIG. 8, the application framework layer may include a window manager, a content provider, a view system, a telephony manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable these data to be accessible to an application.

The data may include videos, images, audio, outgoing and incoming calls, browsing histories and bookmarks, phone books, and the like.

The view system includes visual controls such as a text display control and a picture display control. The view system may be configured to build an application program. A display interface may include one or more views. For example, a display interface including an SMS message notification icon may include a text display view and a picture display view.

The telephony manager is configured to provide a communications function for the electronic device 100, such as management of a call status (including connection, hanging up, and the like).

The resource manager provides various resources for application programs, such as localized strings, icons, pictures, layout files, and video files.

The notification manager enables application programs to display notification information in a status bar, may be configured to convey notification-type messages, and may automatically disappear after a short pause without user interaction. For example, the notification manager is used to notify download completion, a message alert, and the like. The notification manager may be alternatively a notification that appears on a top status bar of the system in a form of a graph or a scroll bar text, for example, a notification of an application program running in the background, or may be a notification that appears on the screen in a form of a dialog interface. For example, text information is prompted on a status bar, a prompt tone is made, the electronic device vibrates, or an indicator light flashes.

The runtime (Runtime) includes a core library and a virtual machine. The runtime is responsible for scheduling and managing a system.

The core library includes two parts: a performance function that programming language (for example, Java language) needs to invoke, and a core library of the system.

The application layer and the application framework layer run in a virtual machine. The virtual machine executes programming files (for example, Java files) at the application layer and the application framework layer as binary files. The virtual machine is configured to perform functions such as object lifecycle management, stack management, thread management, security and abnormality management, and garbage collection.

The system libraries may include a plurality of function modules, for example, a surface manager (Surface Manager), media libraries (Media Libraries), a three-dimensional graphics processing library (for example, OpenGL ES), and a two-dimensional graphics engine (for example, SGL).

The surface manager is configured to manage a display subsystem, and provide fusion of two dimensional (2-Dimensional, 2D) and three-dimensional (3-Dimensional, 3D) layers to a plurality of application programs.

The media libraries support playback and recording in a plurality of common audio and video formats, and also support still image files, and the like. The media libraries may support a plurality of audio and video encoding formats, such as MPEG4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver.

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into a raw input event (including information such as touch coordinates and a time stamp of the touch operation). The raw input event is stored at the kernel layer. The application framework layer obtains the raw input event from the kernel layer, and identifies a control corresponding to the input event. For example, the touch operation is a touch tap operation, and a control corresponding to the tap operation is a control of a camera application icon. A camera application invokes an interface of the application framework layer to start the camera application, so that the kernel layer is invoked to start a camera driver, and the camera 193 captures a still image or a video.

Some photographing scenarios provided by this application are described below.

User interfaces shown in FIG. 9A to FIG. 9E illustrate some example user interfaces used when the electronic device 100 is photographing.

The term "user interface" in the specification, claims, and accompanying drawings of this application is a media interface for an interaction and information exchange between an application program or an operating system and a user. The media interface implements conversion between an internal form of information and a form acceptable to the user. A common form of expression of the user interface is a graphic user interface (graphic user interface, GUI), which is a user interface that is displayed in a graphical manner and that is related to a computer operation. The graphic user interface may be an interface element such as an icon, a window, or a control that is displayed on a display of an electronic device. The control may include visible interface elements such as an icon, a button, a menu, a tab, a text box, a dialog box, a status bar, a navigation bar, and a widget.

1. The Electronic Device 100 Performs Motion Detection (FIG. 9A to FIG. 9C).

Figure 9A:
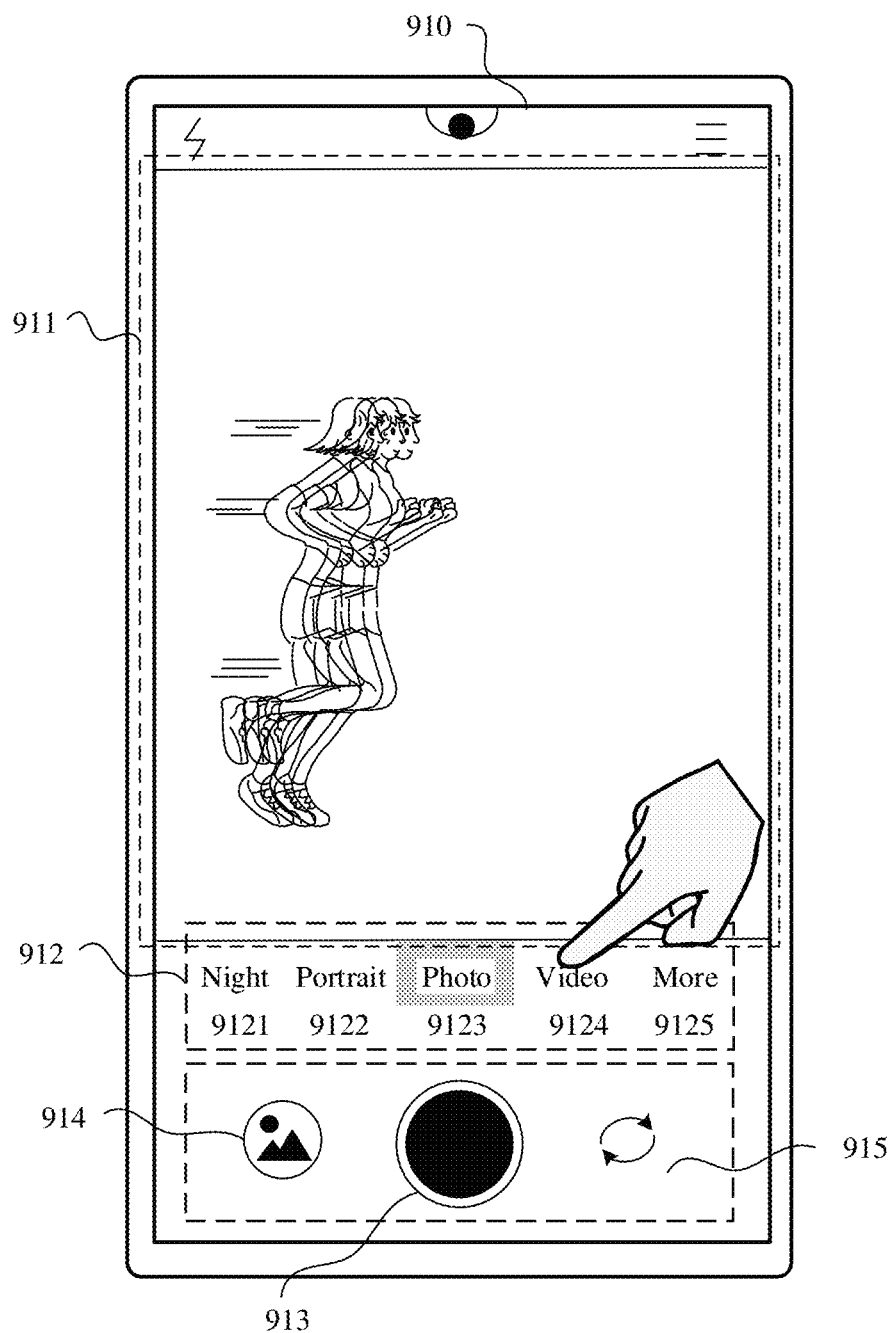
FIG. 9A to FIG. 9E are schematic diagrams of a group of user interfaces according to an embodiment of this application.
Figure 9B:
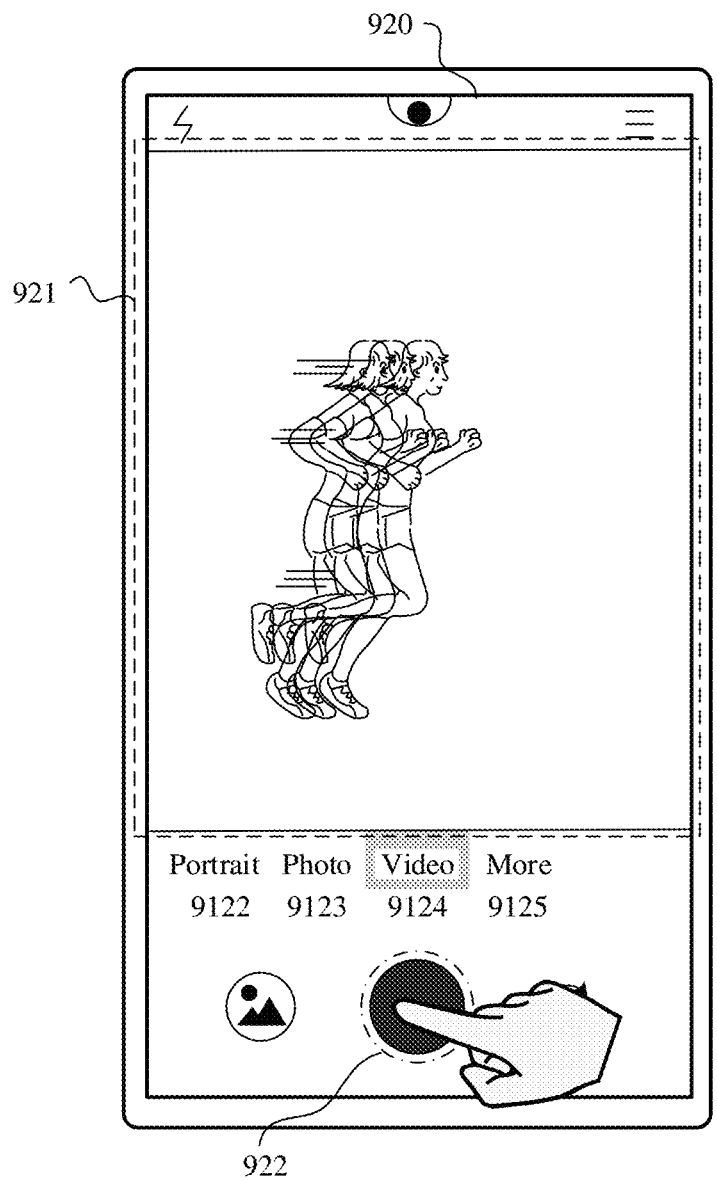
Figure 9C:
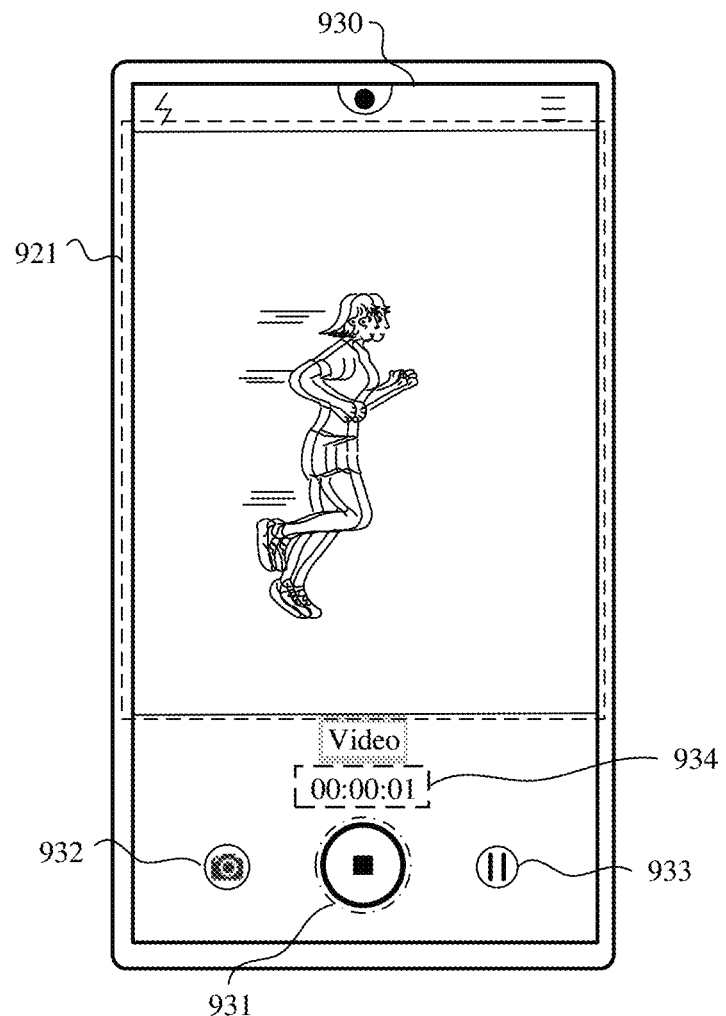

FIG. 9A illustrates an example user interface 910 on the electronic device 100. The user interface 910 displays a photographing interface, which may include a preview region 911, a camera mode option 912, a shutter control 913, an album shortcut control 914, and a camera flip control 915.

The preview region 911 may be configured to display a preview image. The preview image is an image captured in real time by the electronic device 100 by using a camera. The electronic device may refresh, in real time, content displayed in the preview region 911, so that the user can preview an image captured by the camera currently.

One or more photographing mode options may be displayed in the camera mode option 912. The one or more photographing mode options may include a night mode option 9121, a smart portrait mode option 9122, a photo mode option 9123, a video mode option 9124, and a "more" option 9125. It may be understood that the one or more photographing mode options may be presented as textual information, such as "night", "smart portrait", "photo", "video", "more", at the interface, or may be presented as an icon or another form of interactive element (interactive element, IE). This is not limited in this application. When a user operation acting on a photographing mode option is detected, the electronic device 100 may enable the photographing mode selected by the user. In particular, when a user operation acting on the "more" option 9125 is detected, the electronic device 100 may further display more other photographing mode options, such as a time-lapse photographing mode option and a burst shooting mode option thereby presenting richer photographing functions to the user.

The shutter control 913 may be configured to monitor a user operation for triggering photographing. The electronic device 100 may detect a user operation acting on the shutter control 913, and in response to the operation, the electronic device 100 may save a preview image in the preview region 911 as an image in an album application program. In addition, the electronic device 100 may also display a thumbnail of the saved image in the album shortcut control 914. In other words, the user may trigger photographing by using an operation acting on the shutter control 913. It may be understood that the shutter control 913 may be a button or another form of control. This is not limited in this application.

The album shortcut control 914 may be configured to open an album application program. In response to a user operation acting on the album shortcut control 914, for example, a tap operation, the electronic device 100 may open the album application program. In this way, the user can conveniently view a captured photo and video without the need of exiting the camera application program before opening the album application program. A gallery application program is an application program for picture management on an electronic device such as a smart phone or a tablet computer, and may also be referred to as an "album". A name of the application program is not limited in this embodiment.

The camera flip control 915 may be configured to monitor a user operation for triggering flip of a camera. The electronic device 100 may detect a user operation acting on the camera flip control 915, such as a tap operation, and in response to the operation, the electronic device 100 may flip the photographing camera, such as switching from a rear camera to a front camera, or switching from a front camera to a rear camera.

It may be understood that more or fewer controls may be included at the user interface 910, and this is not limited in the embodiments of this application.

In some embodiments, the electronic device 100 may start to perform motion detection on a photographed subject in the preview region 911 when the electronic device 100 displays the user interface 910. In other words, after the user triggers the camera application program, the electronic device 100 may display the photographing interface (that is, the user interface 910) in response to the triggering operation. The electronic device 100 may obtain an image, display the image in the preview region 911, and trigger motion detection. To be specific, the electronic device 100 detects whether the photographed subject is moving relative to the electronic device 100.

It may be understood that a running person shown in the preview region 911 is the photographed subject this time for the electronic device 100.

The electronic device 100 may detect a user operation acting on the video mode option 9124, and in response to the user operation, the electronic device 100 may display a video preview interface 920.

FIG. 9B illustrates an example video preview interface 920. As shown in FIG. 9B, controls included at the video preview interface 920 are substantially the same as the controls included at the user interface 910. In addition, the video preview interface 920 may include a video preview region 921 and a video start control 922.

The video preview region 921 may be configured to display a preview image. The preview image is an image captured in real time by the electronic device 100 by using a camera. The electronic device may refresh, in real time, content displayed in the video preview region 921, so that the user can preview an image captured by the camera currently.

It may be understood that a default camera in a default video mode is not limited to a rear camera, and the electronic device 100 may alternatively set a front camera to the default camera. To be specific, after a user operation acts on the video mode option 9124, the electronic device 100 may display an image captured by the front camera in the video preview region 921 at the video preview interface 920, so that a user can record a video by using the default front camera.

In some embodiments, the electronic device 100 may start to perform motion detection on a photographed subject in the video preview region 921 when the electronic device 100 displays the video preview interface 920. To be specific, when the electronic device 100 starts to display the video preview interface 920 due to a user operation acting on the video mode option 9124, the electronic device 100 may obtain an image, display the image in the video preview region 921, and at this time trigger motion detection, to be specific, detect whether a relative motion exists between the photographed subject and the electronic device 100.

It may be understood that a running person shown in the video preview region 921 is the photographed subject this time for the electronic device 100.

When the electronic device 100 detects a user operation acting on the video start control 922, for example, a tap operation, the electronic device 100 may start recording a video and display a video interface 930 shown in FIG. 9C. Controls at the video interface 930 are substantially the same as the controls at the user interface 910. A difference lies in that no camera mode option 912 exists at the video interface 930. The video interface 930 may include a video end control 931, a shutter control 932, a video pause control 933, and a video time control 934. The shutter control 932 may be configured to trigger photographing, in other words, the user may trigger the shutter control 932 to take a photo during the recording. The video end control 931 may be configured to stop recording a video. The video pause control 933 may be configured to temporarily stop recording a video. The video time control 934 may indicate a length of time for a currently recorded video. As shown in FIG. 9C, 00:00:01 is displayed on the video time control 934, and indicates that the current video has been recorded for 1 second (s). For functions of other controls at the video interface 930, refer to the description of the user interface 910 shown in FIG. 9A. Details are not described herein again.

In some embodiments, the electronic device 100 may start to perform motion detection on a photographed subject in the video preview region 921 when the electronic device 100 displays the video interface 930. To be specific, when the electronic device 100 starts to display the video interface 920 due to a user operation acting on the video start control 922, the electronic device 100 may obtain an image, display the image in the video preview region 921, and at this time trigger motion detection, to be specific, detect whether a relative motion exists between the photographed subject and the electronic device 100.

It may be understood that a running person shown in the video preview region 921 is the photographed subject this time for the electronic device 100.

2. The Electronic Device 100 Reduces an Exposure Time and Adjusts a Frame Interval.

According to the foregoing description, the electronic device 100 may trigger motion detection when the user interface 910/video preview interface 920/video interface 930 is displayed due to a user operation.

In some embodiments, if the electronic device 100 detects a relative motion between the photographed subject and the electronic device 100, the electronic device 100 may further determine whether an artificial light source is present in the current photographing scenario.

If no artificial light source exists in the current photographing scenario, no banding phenomenon exists in the captured images of the electronic device 100. Then, the electronic device 100 may gradually reduce the exposure time by a step size A during the photographing, to reduce a displacement of the photographed subject within the exposure time, thereby attenuating a motion blur. For example, each time a frame of image is exposed to the electronic device 100, the exposure time is reduced by 1 millisecond until a corresponding ISO value reaches an upper limit, so that the exposure time is not reduced, thereby not only attenuating a motion blur but also ensuring image quality.

If an artificial light source is present in the current photographing scenario, the electronic device 100 may determine a flicker frequency of the artificial light source. The electronic device 100 may determine a frame interval for photographing based on the flicker frequency of the artificial light source, and gradually reduce the exposure time by a step size B during photographing. For example, the electronic device 100 determines that the flicker frequency of the artificial light source is 100 Hz. The flicker period of the artificial light source is 10 ms. The electronic device 100 may set the frame interval to an integer multiple (for example, 30 ms) of the flicker period of the artificial light source. To be specific, a difference between times at which the first rows in two adjacent frames of images start exposure is 30 ms. For example, the electronic device 100 may start to expose the first frame of image at a time t1. Herein, the electronic device 100 may perform row-by-row exposure on the first frame of image. An exposure time of each row of pixels in the first frame of image may be 20 ms. Further, the electronic device 100 may start to expose the second frame of image at a time (t1+30 ms). The second frame of image and the first frame of image may be two adjacent frames of images captured by the electronic device 100. Herein, the electronic device 100 may perform row-by-row exposure on the second frame of image. An exposure time of each row of pixels in the second frame of image may be 18 ms. By analogy, the electronic device 100 may expose a $(k+1)^{th}$ frame of image at a time [t1+30*k (ms)]. An exposure time of each row of pixels in the $(k+1)^{th}$ frame of image may be [20−2*k (ms)]. It may be understood that k is a positive integer not greater than 10. It can be learned that a difference between times at which two adjacent frames of images start exposure is an integer multiple of the flicker period of the artificial light source. Further, the electronic device 100 gradually reduces the exposure time by 2 ms (that is, the step size B). In this way, an initial phase at which an $N^{th}$ row in each frame of image starts exposure remains the same, and bright and dark streaks in the captured images no longer scroll.

It may be understood that the step size A and the step size B used by the electronic device 100 may be the same or different, and this is not limited in this application. In addition, both the step size A and the step size B are small values. In some embodiments of this application, both the step size A and the step size B are less than an integer multiple of the flicker period of the artificial light source.

It may be understood that specific implementations for reducing the exposure time and adjusting the frame interval will be described in the subsequent embodiments, and details will not be described herein.

Figure 9D:
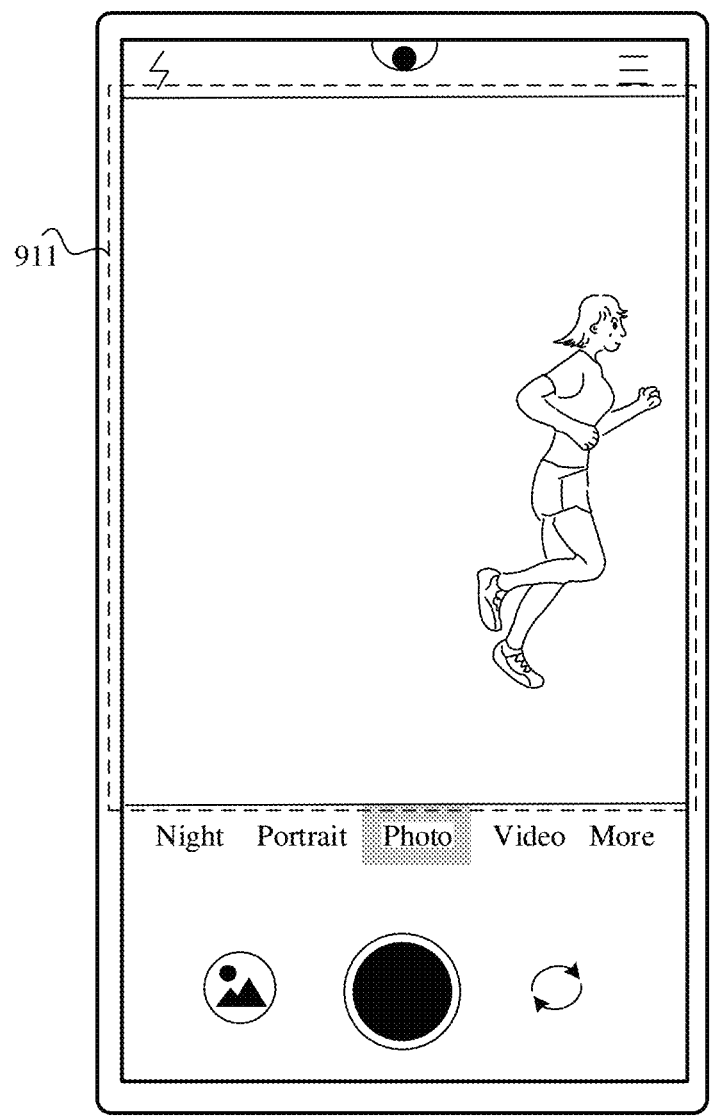

If the electronic device 100 triggers motion detection when displaying the user interface 910 due to a user operation, after the electronic device 100 reduces the exposure time according to the foregoing method, the photographed subject displayed in the preview region 911 becomes clearer (as shown in FIG. 9D), and a large quantity of noise caused by a drastic change in ISO does not occur in the photographing preview image.

If the electronic device 100 triggers motion detection when displaying the video preview interface 920 due to a user operation, similar to the foregoing motion detection triggered during the photographing preview, after the electronic device 100 reduces the exposure time according to the foregoing method, the photographed subject displayed in the video preview region 921 becomes clearer, and a large quantity of noise caused by a drastic change in ISO does not occur in the video preview image.

Figure 9E:
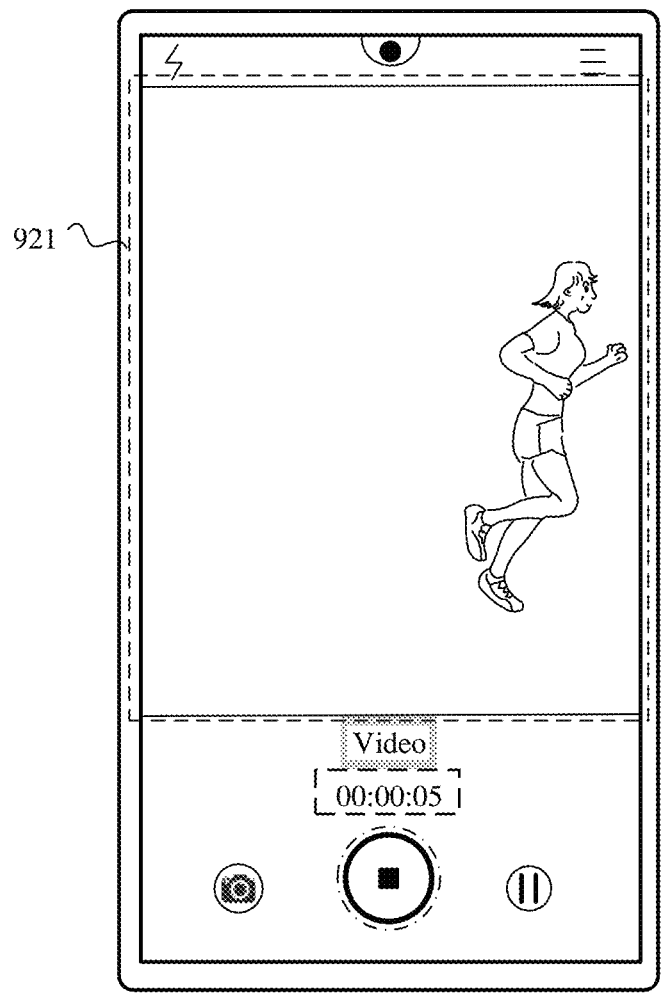

If the electronic device 100 triggers motion detection when displaying the video interface 930 due to a user operation, motion detection is performed during recording a video. As shown in FIG. 9C, the video time control 934 shows that the first second of the video is being recorded, motion detection is triggered at this time, and the electronic device 100 has determined that the photographed subject is in a moving state, so that the exposure time for obtaining each frame of image is decreasing frame by frame. In addition, as shown in FIG. 9E, 00:00:05 is displayed on the video time control 934, and indicates that the current video has been recorded for 5 s. The photographed subject shown in the video preview region 921 of FIG. 9E is clearer than the photographed subject shown in the video preview region 921 of FIG. 9C, and the motion blur appearing in FIG. 9C is attenuated. In addition, a large quantity of noise caused by a drastic change in ISO does not occur in the video images.

Figure 10:
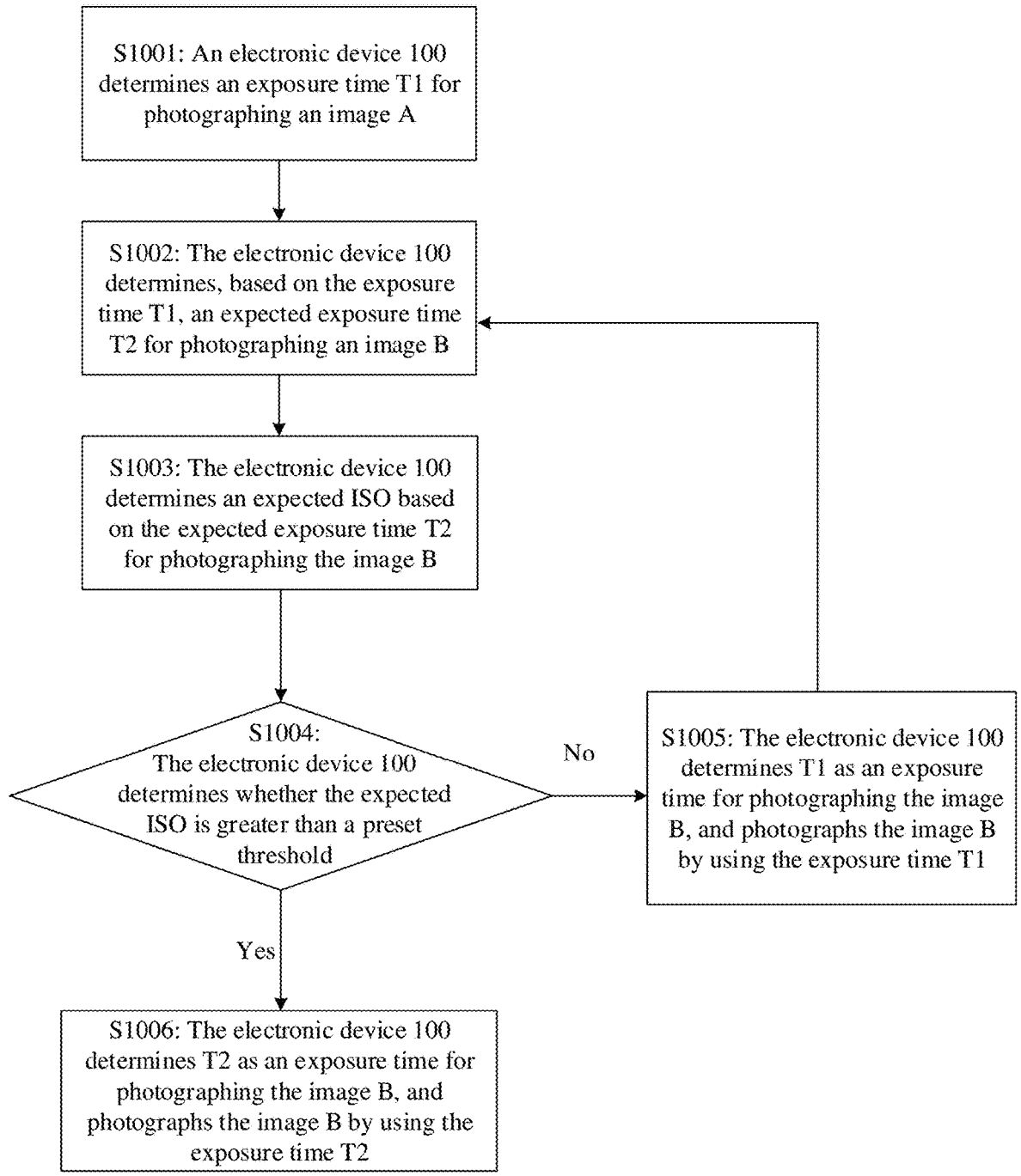
FIG. 10 is a flowchart for reducing an exposure time according to an embodiment of this application.

The following describes in detail a method for adjusting an exposure time provided in an embodiment of this application with reference to FIG. 10.

S1001: The electronic device 100 determines an exposure time T1 for photographing an image A.

Specifically, during previewing or recording, the electronic device 100 determines the exposure time for photographing the image A. An exposure time of the electronic device 100 is denoted as ET. The exposure time used by the electronic device 100 to obtain the image A is denoted as T1. The electronic device 100 determines that a current exposure time is ET=T1.

It may be understood that the image A may be a latest frame of image photographed by the electronic device 100, or may be an image photographed at another time. This is not limited in this application.

It may be understood that the exposure time used by the electronic device 100 to obtain the image A may be read from a sensor, or when exposure parameters like the exposure time are stored at a specified memory address, the electronic device 100 may obtain the exposure time by accessing the specified memory address.

S1002: The electronic device 100 determines, based on the exposure time T1, an expected exposure time T2 for photographing an image B.

Specifically, the electronic device 100 determines, based on T1, the expected exposure time for photographing the image B, and denotes the expected exposure time as T2. It may be understood that the expected exposure time is an expected exposure time for photographing the image B that is determined by the electronic device 100 based on the exposure time T1 for photographing the image A and a step size (first step size) for reducing the exposure time. The first step size is denoted as a. Therefore, the electronic device 100 determines the expected exposure time in a specific manner: T2=ET−a.

It may be understood that the step size for reducing the exposure time may be set based on an actual requirement. For example, a may be 1 millisecond (ms), 2 milliseconds (ms), or the like. In addition, when the electronic device 100 gradually reduces the exposure time by the first step size, the first step may be changed. For example, the electronic device 100 gradually reduces exposure times for photographing an image O, an image P, and an image Q by the first step size. A photographing time of the image O is earlier than a photographing time of the image P, and the photographing time of the image P is earlier than a photographing time of the image Q. The exposure time used by the electronic device 100 to photograph the image O is 1 ms. The exposure time used by the electronic device to photograph the image P is 2 ms. The exposure time used by the electronic device to photograph the image Q is 3 ms.

It may be understood that the first step size is a small value. In some embodiments of this application, the first step size is less than an integer multiple of a flicker period of an artificial light source.

S1003: The electronic device 100 determines an expected ISO based on the expected exposure time T2 for photographing the image B.

Specifically, if an exposure intensity remains unchanged, the electronic device 100 may determine an ISO corresponding to the expected exposure time, that is, the expected ISO, according to a relationship among an exposure intensity, an exposure time, and an ISO (Exposure intensity=Exposure time*ISO). In other words, Exposure intensity used by the electronic device 100 to obtain the image A=Expected exposure time*Expected ISO.

It may be understood that the electronic device 100 may determine the exposure intensity based on the exposure time for obtaining the image A (for example, in step S1001) and the corresponding ISO. The ISO used by the electronic device to obtain the image A may also be read from a sensor, or when exposure parameters like the ISO are stored at a specified memory address, the electronic device 100 may obtain the ISO by accessing the specified memory address.

S1004: The electronic device 100 determines whether the expected ISO is greater than a preset threshold.

According to the foregoing description, the ISO represents an amplification gain of an electronic signal. Increasing ISO not only amplifies a wanted signal but also amplifies noise. Therefore, a higher ISO indicates a larger quantity of noise in the image obtained by the electronic device 100 and poorer quality of the image. Therefore, in an actual photographing process, a reasonable range usually needs to be set for the ISO so that the wanted signal is amplified while the amplified noise is also within the noise reduction capability range of the electronic device 100.

In this application, a preset threshold may be set to determine whether the ISO used by the electronic device 100 is within an appropriate range. Specifically, the electronic device 100 determines whether the expected ISO is greater than the preset threshold. When the expected ISO is greater than the preset threshold, the exposure time is no longer reduced, so the exposure time is ET=T1. When the expected ISO is not greater than the preset threshold, a subsequent step is performed.

S1005: The electronic device 100 determines T1 as an exposure time for photographing the image B, and photographs the image B by using the exposure time T1.

Specifically, when the expected ISO is not greater than the preset threshold, the electronic device 100 updates the exposure time to the expected exposure time T2, that is, ET=T2. In other words, the electronic device 100 determines T1 as the exposure time for photographing the image B.

It may be understood that after updating the exposure time, the electronic device 100 will use the new exposure time to obtain the image B. After obtaining the image B, the electronic device 100 performs step S1002 to step S1005 again. Therefore, the electronic device 100 cyclically performs step S1002 to step S1005, until the expected ISO is greater than the preset threshold. In other words, the electronic device 100 decreases the exposure time on a frame-by-frame basis by the first step size a within an appropriate range (ISO is not greater than the preset threshold).

S1006: The electronic device 100 determines T2 as an exposure time for photographing the image B, and photographs the image B by using the exposure time T2.

Specifically, when the expected ISO is greater than the preset threshold, the electronic device 100 still uses the exposure time T2 for photographing the image A to photograph the image B, that is, ET=T2. In other words, the electronic device 100 determines T2 as the exposure time for photographing the image B.

It should be noted that if no artificial light source exists in the current photographing environment, the exposure time can be reduced according to step S1001 to step S1005. If an artificial light source is present in the current photographing environment, the electronic device 100 also needs to determine a flicker frequency of the artificial light source, and determine a frame interval based on the flicker frequency.

In some embodiments, before determining the expected exposure time, the electronic device 100 may also determine whether a motion blur exists in an image Z, which is a latest frame of image obtained by the electronic device 100. If the electronic device 100 determines that a motion blur exists in the image Z, the electronic device 100 may continue to perform step S1002 to step S1005. If the electronic device 100 determines that no motion blur exists in the image Z, the exposure time is no longer reduced. In other words, after obtaining an image by using the updated exposure time, the electronic device 100 may determine whether a motion blur exists in the image, thereby determining whether the current exposure time has been reduced to an appropriate value. In this way, the electronic device 100 does not necessarily reduce the exposure time to a minimum value (that is, the corresponding ISO is increased to the preset threshold), and it is possible to not only avoid a large quantity of noise in the image but also attenuate the motion blur.

It may be understood that there are many ways in which the electronic device 100 determines whether a motion blur exists in the image Z. For example, the electronic device 100 may create a sample of a motion-blurred image and a sample of a clear image, perform wavelet decomposition on the sample images, and further analyze high-frequency information of the images, to obtain a high-frequency information distribution of the clear sample image and a high-frequency information distribution of the motion-blurred sample image. The electronic device 100 may determine, based on the high-frequency information distributions of the two types of images, whether a motion blur exists in the image Z. Of course, there are other methods for detecting a motion blur, and this is not limited in this application.

It may be understood that the latest frame of image mentioned above is a latest frame of image exposed by the sensor of the electronic device 100, and the image is not necessarily a preview image.

The following describes in detail a method for adjusting a frame interval based on a flicker frequency of an artificial light source when the artificial light source is present in a photographing environment.

1. Obtain a Time Sequence of Ambient Brightness.

A fine photosensitive substance, that is, a pixel, is implanted on a photosensitive surface of a photosensitive sensor such as a charge coupled device (Charge Coupled Device, CCD) or a complementary metal-oxide semiconductor (Complementary Metal-Oxide Semiconductor, CMOS). The photosensitive sensor converts an optical image on each pixel on the photosensitive surface of the photosensitive sensor into an electrical signal.

Similar to the photosensitive sensor described above, a flicker sensor (Flicker Sensor) also converts an optical image on each pixel on a photosensitive surface into an electrical signal. However, the flicker sensor has only one pixel and is not light-filtered, so the electrical signal output by the flicker sensor is an electrical signal converted from an optical image on the only one pixel. It may be understood that the electrical signal output by the flicker sensor may be used to represent current ambient brightness. In other words, the electrical signal output by the flicker sensor can be considered as the current ambient brightness.

When a user triggers a photographing function of the electronic device 100, the flicker sensor in the electronic device 100 starts to sample an ambient light, and outputs a time for each sampling and a corresponding electrical signal. It may be understood that the flicker sensor outputs a time sequence of ambient brightness. It can be learned that the time sequence of ambient brightness is a one-dimensional time sequence.

It may be understood that a sampling frequency of the flicker sensor may be set based on an actual requirement, and this is not limited in this application. For example, the sampling frequency of the flicker sensor is 2 kHz, that is, the flicker sensor performs sampling every 0.5 milliseconds (ms).

2. Determine a Flicker Frequency of an Artificial Light Source.

The electronic device 100 performs a Fourier transform or a fast Fourier transform (fast fourier transform, FFT) on the obtained time sequence of ambient brightness. To be specific, the time sequence of ambient brightness is converted from time domain to frequency domain. The electronic device 100 may obtain a spectrum. The spectrum is denoted as Spectrum1. It may be understood that an abscissa of the spectrum is a frequency and an ordinate is an amplitude (an amplitude intensity of a signal).

According to the Fourier principle, any continuously measured time sequence or signal can be expressed as an infinite superposition of sine wave signals at different frequencies. In the embodiment provided in this application, after converting the time sequence of ambient brightness to the frequency domain, the obtained spectrum (Spectrum1) includes a plurality of sine waves.

The following describes four methods for determining a flicker frequency of an artificial light source for example.
Method 1:

The electronic device 100 sets a frequency search range, for example, 20 Hz-2000 Hz. Within the frequency look-up range of the spectrum Spectrum1, a largest sine wave peak is selected and denoted as $A_1$, a frequency corresponding to the sine wave is denoted as $F_1$, the sine wave corresponding to the sine wave peak is denoted as sine wave1. The electronic device 100 may also calculate an average value of sine wave peaks of sine waves other than sine wave1 in the spectrum Spectrum1, and denote the average value as $A_{avr}$. The electronic device 100 calculates a difference between $A_1$ and $A_{avr}$, and denotes the difference as B, that is, $B=A_1-A_{avr}$. If B is greater than a first preset threshold, the electronic device 100 determines that an artificial light source is present in the current photographing environment, and that a flicker frequency of the artificial light source is $F_1$; otherwise, the electronic device 100 determines that no artificial light source exists in the current photographing environment.

It may be understood that the first preset threshold may be set based on an actual requirement, and this is not limited in this application.

Figure 11:
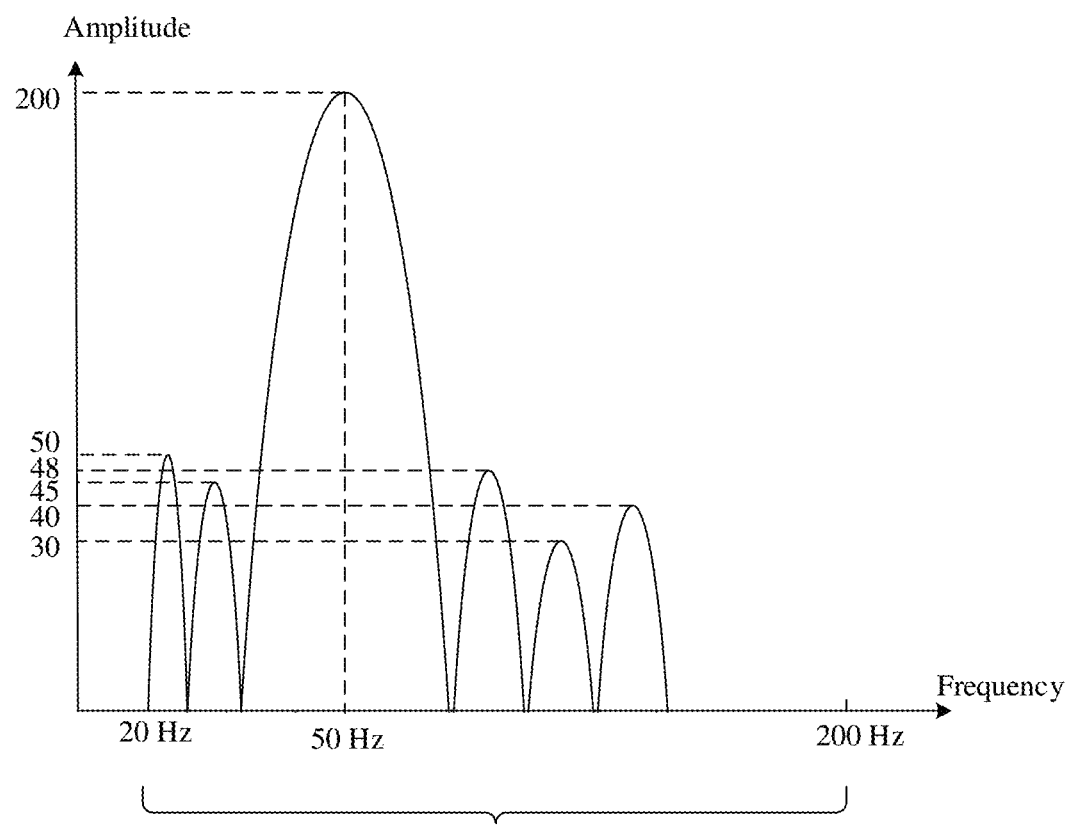
FIG. 11 is a spectrum diagram according to an embodiment of this application.

For example, the first preset threshold is 100. FIG. 11 is a spectrum diagram according to an embodiment of this application. The electronic device sets a frequency search range, which is 20 Hz-200 Hz. A largest sine wave peak in the 20 Hz-200 Hz range and its corresponding frequency are searched for in the spectrum shown in FIG. 11. As can be learned, the largest sine wave peak is $A_1=200$, and the frequency corresponding to the sine wave peak is $F_1=50$ Hz. It can also be obtained from FIG. 11:

$$A_{avr} = \frac{(30+40+45+48+50)}{5} = 42.6.$$

Therefore, a difference between $A_1$ and $A_{avr}$ is $B=A_1-A_{avr}=200-42.6=157.4$. Obviously, B is greater than the first preset threshold, the electronic device 100 determines that an artificial light source is present in the current photographing environment, and that the flicker frequency of the artificial light source is 50 Hz.
Method 2:

The electronic device 100 sets a frequency search range, for example, 20 Hz-2000 Hz. Within the frequency look-up range in the spectrum Spectrum1, a largest sine wave peak is selected and denoted as $A_1$, and a frequency corresponding to the sine wave is denoted as $F_1$. Then a second largest sine wave peak is selected and denoted as $A_2$, and a frequency corresponding to the sine wave is denoted as $F_2$. The electronic device 100 calculates a difference between $A_1$ and $A_2$ and denotes the difference as C, that is, $C=A_1-A_2$. If C is greater than a second preset threshold, the electronic device 100 determines that an artificial light source is present in the current photographing environment, and that a flicker frequency of the artificial light source is $F_1$; otherwise, the electronic device 100 determines that no artificial light source exists in the current photographing environment.

It may be understood that the second preset threshold may be set based on an actual requirement, and this is not limited in this application.

Figure 12:
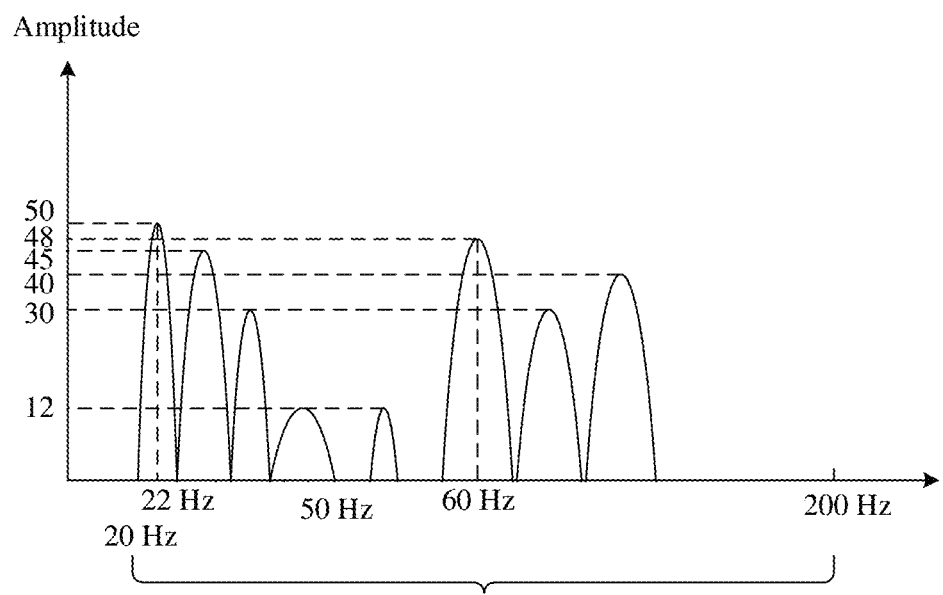
FIG. 12 is another spectrum diagram according to an embodiment of this application.

For example, the second preset threshold is 120. FIG. 12 is another spectrum diagram according to an embodiment of this application. The electronic device sets a frequency search range, which is 20 Hz-200 Hz. A largest sine wave peak and its corresponding frequency, and a second largest sine wave peak and its corresponding frequency are searched for in the 20 Hz-200 Hz range in the spectrum shown in FIG. 11. As can be learned, the largest sine wave peak is $A_1=50$, the frequency corresponding to the sine wave peak is $F_1=22$ Hz, the second largest sine wave peak is $A_2=48$, and the frequency corresponding to the sine wave peak is $F_2=60$ Hz. The electronic device 100 calculates a difference between $A_1$ and $A_2$ and the difference is $C=A_1-A_2=50-48=2$. Obviously, C is not greater than the preset threshold, and the electronic device 100 determines that no artificial light source exists in the current photographing environment.

Method 3:

The electronic device 100 sets a frequency search range, for example, 20 Hz-2000 Hz. Within the frequency look-up range in the spectrum Spectrum1, a largest sine wave peak is selected and denoted as $A_1$, and a frequency corresponding to the sine wave is denoted as $F_1$. The electronic device 100 determines that a flicker frequency of an artificial light source in the current photographing environment is $F_1$.

Method 4:

The electronic device 100 sets a frequency search range, for example, 20 Hz-2000 Hz. Within the frequency look-up range in the spectrum Spectrum1, a largest sine wave peak is selected and denoted as $A_1$, and a frequency corresponding to the sine wave is denoted as $F_1$. If $A_1$ is greater than a third preset threshold, the electronic device 100 determines that an artificial light source exists in the current photographing environment, and that a flicker frequency of the artificial light source is $F_1$; otherwise, the electronic device 100 determines that no artificial light source exists in the current photographing environment.

It should be noted that there are other methods for determining a flicker frequency of an artificial light source, and the four methods are merely examples and should not be construed as limiting this application.

3. Determine a Frame Interval Based on the Frequency of the Artificial Light Source.

When a flicker is present in the ambient light source, the banding phenomenon needs to be attenuated. The electronic device 100 may set the frame interval to an integer multiple of the flicker period, so that an initial phase used when the sensor starts to expose first rows of pixels in different images remains unchanged, and a magnitude relationship between light energy received in different rows of pixels in each frame of image remains unchanged.

It may be understood that the frame interval is a frame interval for the sensor to expose an image. A time at which the first row of pixels in a frame of image starts exposure is denoted as ET1, a time at which the first row of pixels in a frame of image following the frame of image starts exposure is denoted as ET2, and the frame interval is ET2−ET1.

If light energy received by different rows of pixels in a same frame of image is sorted in ascending or descending order, the sorting is denoted as X. X may be viewed as a two-dimensional array including sequence numbers of the permutations and corresponding row numbers. For example, $\{(1, M_1), (2, M_2), (3, M_3), \ldots, (N, M_N)\}$, where 1 to N indicate sequence numbers arranged in ascending or descending order, $M_1$ to $M_N$ indicate pixel row numbers corresponding to the foregoing sequence numbers. Although the $N^{th}$ rows of pixels in different images may receive different amounts of light energy, X remains unchanged for different images.

It may be understood that the amounts of light energy received by different rows of pixels in an image may be reflected by brightness of the different rows of pixels in the image. In other words, the $N^{th}$ row in each frame of image may be different from each other in brightness, but remain unchanged in brightness relative to other rows in the same image. In other words, after the electronic device 100 sets the frame interval to an integer multiple of the flicker period, the bright and dark streaks can no longer scroll. Thus, impact of the banding phenomenon on the image brightness is attenuated.

In one embodiment of this application, the frame interval may be set according to Table 1.

TABLE 1

| Flicker frequency | 60 Hz | 80 Hz | 90 Hz | 100 Hz | 120 Hz | 150 Hz |
|---|---|---|---|---|---|---|
| Frame interval | 33 ms | 37 ms | 33 ms | 30 ms | 33 ms | 33 ms |

The frame interval is determined according to Table 1, thereby not only attenuating the banding phenomenon, to be specific, when an artificial light source is present in the photographing environment, the bright and dark streaks appearing on the display of the electronic device 100 do not scroll, but also meeting a playback requirement of 30 FPS, to be specific, 30 frames of images are transmitted per second.

Figure 13:
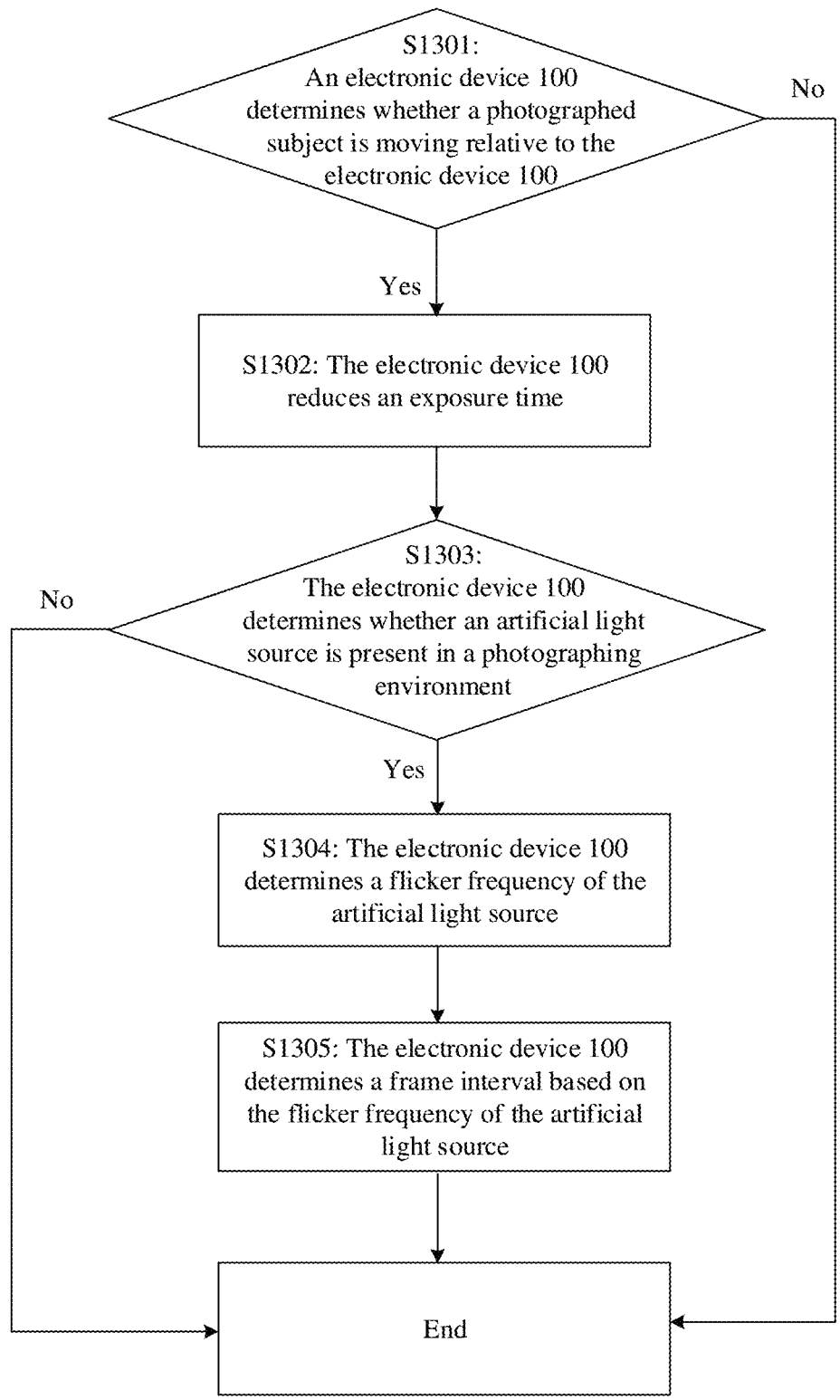
FIG. 13 is a flowchart of a method for adjusting an exposure time according to an embodiment of this application.

FIG. 13 illustrates an example flowchart of a photographing method according to an embodiment of this application.

S1301: The electronic device 100 determines whether a photographed subject is moving relative to the electronic device 100.

It may be understood that there may be three cases for the relative motion between the electronic device 100 and the photographed subject: 1) The electronic device 100 is in a moving state and the photographed subject is still; 2) the electronic device 100 is still and the photographed subject is in a moving state; and 3) both the electronic device 100 and the photographed subject are in a moving state.

There are many methods for detecting whether a relative motion exists between the photographed subject and the electronic device 100, and details will be described below.

Method 1: The electronic device 100 may use a sensor of the electronic device 100 to determine a motion status of the electronic device 100, to be specific, determine whether the electronic device 100 is in a moving state. For example, information such as an orientation, a speed, and an acceleration of the electronic device 100 may be obtained by using a gyroscope sensor (as the gyroscope sensor 180B shown in FIG. 7) in the electronic device 100.

Method 2: The electronic device 100 may use some detection algorithms to determine a motion status of the photographed subject, to be specific, determine whether the photographed subject is in a moving state.

Specifically, the electronic device 100 may obtain R image frames captured by a camera. It may be understood that R is an integer greater than 2. The R image frames may include an image A. Each of the R image frames includes the photographed subject. The electronic device 100 may determine whether a location of the photographed subject changes in two adjacent image frames in the R image frames, in other words, whether the photographed subject moves in the two adjacent image frames. If the location of the photographed subject changes in the two adjacent image frames in the R image frames, the electronic device 100 determines that a relative motion exists between the photographed subject and the electronic device.

For example, the electronic device 100 may use an optical flow method to detect a motion status of the photographed subject. The electronic device 100 may obtain an image sequence captured by the camera and calculate a velocity vector of a pixel according to a spatio-temporal gradient function of brightness of the image sequence. In other words, the electronic device 100 may obtain an optical flow field. It may be understood that the optical flow field is a two-dimensional vector field, which reflects a trend of change in the grayscale of each point in the image, and can be viewed as an instantaneous velocity field generated by the movement of pixels with grayscale on the image plane. The included information is instantaneous motion velocity vector information of each pixel. It may be understood that if a relative motion exists between the photographed subject in the image sequence and the electronic device 100, a velocity vector of the photographed subject does not coincide with a velocity vector of the background (a portion other than the photographed subject in the image sequence). Therefore, if there are pixels whose motion vectors are inconsistent in the optical flow field, it can be learned that a relative motion exists between the photographed subject and the electronic device 100.

However, the optical flow method is excessively complex and often difficult to calculate in real time, so a Gaussian background model may be used to separate the foreground and the background of an image by modeling the background. The foreground is usually a moving subject (the photographed subject), thereby achieving the purpose of detecting the motion status of the photographed subject. Certainly, other detection algorithms may be used to determine the motion status of the photographed subject, and this is not limited in this application.

It may be understood that the motion status of the photographed subject may be alternatively detected by combining Method 1 and Method 2. For example, if the electronic device 100 detects that the electronic device 100 is in a moving state and/or that the photographed subject is in a moving state, the electronic device 100 determines that the photographed subject is moving relative to the electronic device 100.

S1302: The electronic device 100 reduces an exposure time.

If no artificial light source exists in the current photographing scenario, the electronic device 100 may reduce the exposure time on a frame-by-frame basis by a step size A. If an artificial light source is present in the current photographing scenario, the electronic device 100 may reduce the exposure time on a frame-by-frame basis by a step size B. It may be understood that the specific method for reducing the exposure time has been described in the foregoing embodiments and will not be described here again.

It may be understood that the step size A and the step size B used by the electronic device 100 may be the same or different, and this is not limited in this application. It may be understood that a step size for reducing the exposure time may be denoted as a first step size. In other words, the first step size may be the step size A or the step size B. It should be noted that the first step size is a small value. In some embodiments, the first step size is less than a flicker period of the artificial light source in the photographing environment.

It should be noted that if no artificial light source exists in the photographing environment, the electronic device 100 can reduce the exposure time without performing subsequent steps. If an artificial light source is present in the photographing environment, the electronic device 100 may not only reduce the exposure time, but may also perform subsequent steps.

The embodiment of this application does not limit an execution order between step S1302 and step S1303. In some embodiments, the electronic device 100 may first reduce the exposure time. After reducing the exposure time, the electronic device 100 then determine whether an artificial light source is present in the photographing environment. Alternatively, the electronic device 100 may simultaneously reduce the exposure time and determine the flicker frequency of the artificial light source.

S1303: The electronic device 100 determines whether an artificial light source is present in the photographing environment.

The electronic device 100 may obtain a time sequence of ambient brightness by using a flicker sensor or other similar sensors, and convert the series to the frequency domain to obtain a spectrum. Then, the electronic device 100 may determine, based on the obtained spectrum, whether an artificial light source is present in the current photographing environment. If an artificial light source is present in the photographing environment, step S1304 is performed then. If no artificial light source exists in the photographing environment, no subsequent steps are performed.

It may be understood that the specific determining method has been described in the foregoing embodiments, and details are not described herein again.

The embodiment of this application does not limit an execution order between step S1301 and step S1302. In some embodiments, the electronic device 100 may first determine whether an artificial light source is present in the photographing environment. If it is determined that the artificial light source is present, the electronic device 100 may further determine whether a relative motion exists between the photographed subject and the electronic device 100. Alternatively, the electronic device 100 may simultaneously determine whether an artificial light source is present in the photographing environment, and determine whether a relative motion exists between the photographed subject and the electronic device 100.

S1304: The electronic device 100 determines a flicker frequency of the artificial light source.

The electronic device 100 may determine the flicker frequency of the artificial light source based on the spectrum obtained in step S1303. The specific determining method has been described in the foregoing embodiments, and details are not described herein again.

S1305: The electronic device 100 determines a frame interval based on the flicker frequency of the artificial light source.

The electronic device 100 may set the frame interval to an integer multiple of the flicker period of the artificial light source. It may be understood that the specific method for setting the frame interval has been described in the foregoing embodiments, and details are not described herein again.

The embodiment of this application does not limit an execution order between step S1304 and step S1305. In some embodiments, the electronic device 100 may first determine the frame interval based on the flicker frequency of the artificial light source. After the electronic device 100 determines the frame interval, the electronic device 100 may reduce the exposure time. Alternatively, the electronic device 100 may simultaneously determine the frame interval based on the flicker frequency of the artificial light source and reduce the exposure time.

It may be understood that if the photographed subject is moving relative to the electronic device 100, the electronic device 100 can reduce impact of motion blur on the image sharpness by using the photographing method shown in FIG. 13. If an artificial light source is also present in the photographing environment, the method can avoid scrolling bright and dark streaks in captured images without the occurrence of a large quantity of noise caused by a drastic change in ISO in the captured images.

It should be noted that the electronic device mentioned in the claims may be the electronic device 100 in the embodiments of this application.

In some embodiments of this application, the electronic device 100 may sequentially display L image frames captured by the camera at a photographing interface on the display. It may be understood that the image A may be one of the L image frames.

In some embodiments of this application, the image A may be a first image. If a relative motion exists between the photographed subject in the first image and the electronic device 100, the electronic device 100 may sequentially display the L image frames captured by the camera at the photographing interface on the display. If an artificial light source is present in the photographing environment, the electronic device 100 may also determine a flicker period of the artificial light source (refer to the related descriptions described above). The electronic device 100 may adjust, based on the flicker period, a frame interval for photographing the L image frames (refer to the related descriptions described above). In this way, the banding phenomenon caused by the artificial light source can be attenuated so that the bright and dark streaks in the images no longer scroll.

In some embodiments of this application, ISOs of the L image frames are different and sequentially increased. Exposure intensities of the L image frames may be the same as an exposure intensity of the first image.

In some embodiments of this application, the image A may be alternatively a second image and an image B may be a third image.

In some embodiments of this application, the second image may be the first image, and the third image may be an image frame first displayed in the L image frames.

In some embodiments of this application, the second image and the third image may be two adjacent image frames in the L image frames.

In some embodiments of this application, a first exposure time may be T1, a second exposure time may be T1−a, and an expected exposure time may be T2.

In some embodiments of this application, an image Z may be one of the L image frames. The electronic device may perform motion blur detection on the L image frames and determine a value of L based on a result of the motion blur detection. In other words, no motion blur exists in an image frame last displayed in the L image frames on the display. To be specific, a motion blur exists in an $(L-1)^{th}$ image frame in the L image frames, and no motion blur exists in an $L^{th}$ image frame in the L image frames. It may be understood that if the electronic device determines that no motion blur exists in one of the L image frames, the electronic device may stop reducing the exposure time.

In some embodiments of this application, the electronic device may detect a first user operation, and the first user action may be a user operation acting on the video end control 931. The electronic device may save, as a video, K image frames that are captured by the camera and that are displayed at the photographing interface (video preview region 921). A frame interval of the K image frames is the same as the frame interval of the L image frames. An exposure time of any one of the K image frames is the same as an exposure time of an image frame last displayed in the L image frames. It may be understood that K may be a positive integer.

In some embodiments of this application, the electronic device obtains H image frames captured by the camera. The electronic device saves the H image frames as a video. The H image frames include the L image frames or one or more of the L image frames. It may be understood that H may be a positive integer.

As discussed above, the foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the scope of the technical solutions of the embodiments of this application.

What is claimed is:

1. A photographing method, applied to an electronic device comprising a display and a camera, wherein the method comprises:
displaying, by the electronic device, a photographing interface on the display, wherein the photographing interface is configured to display a first image captured by the camera;
sequentially displaying, by the electronic device when a relative motion exists between a photographed subject in the first image and the electronic device, L image frames captured by the camera at the photographing interface, wherein exposure times of the L image frames are different and sequentially decreased, an exposure time of an image frame first displayed in the L image frames is the same as an exposure time of the first image, and L is an integer greater than 2;
determining, by the electronic device, a flicker period of an artificial light source when the artificial light source is present in a photographing environment; and
adjusting, by the electronic device based on the flicker period, a frame interval for photographing the L image frames, wherein the frame interval is an interval between photographing two adjacent frames of images in the L image frames by the camera, and the frame interval is an integer multiple of the flicker period.

2. The method according to claim 1, wherein ISO light sensitivities of the L image frames are different and sequentially increased, exposure intensities of the L image frames are the same as an exposure intensity of the first image, and the exposure intensity is used to represent an exposure.

3. The method according to claim 1, further comprising:
determining, by the electronic device, a first exposure time, wherein the first exposure time is an exposure time used by the camera to photograph a second image;
determining, by the electronic device, a second exposure time based on the first exposure time, wherein the second exposure time is an expected exposure time for the camera to photograph a third image, the first exposure time is greater than the second exposure time, and a difference between the first exposure time and the second exposure time is a first step size;
determining, by the electronic device, an expected ISO light sensitivity based on the second exposure time;

determining, by the electronic device, whether the expected ISO light sensitivity is greater than a preset threshold; and performing the following:

determining, by the electronic device when the expected ISO is greater than the preset threshold, the first exposure time as an exposure time used by the camera to photograph the third image; or determining, by the electronic device when the expected ISO light sensitivity is not greater than the preset threshold, the second exposure time as an exposure time used by the camera to photograph the third image; and wherein the second image is the first image and the third image is the image frame first displayed in the L image frames; or the second image and the third image are two adjacent image frames in the L image frames.

4. The method according to claim 3, wherein the first step size is less than the flicker period.

5. The method according to claim 1, wherein before the sequentially displaying, by the electronic device, L image frames captured by the camera at the photographing interface, the method further comprises:

obtaining, by the electronic device, R image frames captured by the camera, wherein the R image frames comprise the first image, each of the R image frames comprises the photographed subject, and R is an integer greater than 2; and determining, by the electronic device by determining whether a location of the photographed subject changes in two adjacent image frames in the R image frames, whether a relative motion exists between the photographed subject in the first image and the electronic device; and wherein a relative motion exists between the photographed subject in the first image and the electronic device when there are pixels of which the velocity variations are inconsistent in the two-dimensional velocity vector field.

6. The method according to claim 1, further comprising:

performing, by the electronic device, motion blur detection on the L image frames and determining a value of L based on a result of the motion blur detection, wherein a motion blur exists in an $(L-1)^{th}$ image frame in the L image frames, and no motion blur exists in an $L^{th}$ image frame in the L image frames.

7. The method according to claim 1, wherein after the adjusting, by the electronic device based on the flicker period, a frame interval for photographing the L image frames, the method further comprises:

detecting, by the electronic device, a first user operation; and saving, as a video by the electronic device, K image frames that are captured by the camera and that are displayed at the photographing interface, wherein K is a positive integer; and wherein a frame interval of the K image frames is the same as the frame interval of the L image frames, and an exposure time of any one of the K image frames is the same as an exposure time of an image frame last displayed in the L image frames.

8. The method according to claim 1, further comprising:

obtaining, by the electronic device, H image frames captured by the camera, wherein H is a positive integer; and saving, by the electronic device, the H image frames as a video, wherein the H image frames comprise the L image frames or one or more of the L image frames.

9. An electronic device, comprising a display, a camera, one or more memories, and one or more processors, wherein the one or more processors are coupled to the camera and the one or more memories; the one or more memories are configured to store computer program code comprising computer instructions;

wherein the display is configured to:

display a photographing interface, wherein the photographing interface is configured to display a first image captured by the camera, the display is further configured to sequentially display, when a relative motion exists between a photographed subject in the first image and the electronic device, L frames of second images captured by the camera at the photographing interface, wherein exposure times of the L image frames are different and sequentially decreased, an exposure time of an image frame first displayed in the L image frames is the same as an exposure time of the first image, and L is an integer greater than 2; and wherein the computer program code is executable by the processor is configured to:

determine a flicker period of an artificial light source when the artificial light source is present in a photographing environment; and adjust, based on the flicker period, a frame interval for photographing the L image frames, wherein the frame interval is an interval between photographing two adjacent frames of images in the L image frames by the camera, and the frame interval is an integer multiple of the flicker period.

10. The electronic device according to claim 9, wherein ISO light sensitivities of the L image frames are gradually increased, exposure intensities of the L image frames are the same as an exposure intensity of the first image, and the exposure intensity represents an exposure.

11. The electronic device according to claim 9, wherein the computer program code is further executable by the processor to:

determine a first exposure time, wherein the first exposure time is an exposure time used by the camera to photograph a second image;

determine a second exposure time based on the first exposure time, wherein the second exposure time is an expected exposure time for the camera to photograph a third image, the first exposure time is greater than the second exposure time, and a difference between the first exposure time and the second exposure time is a first step size;

determine an expected ISO light sensitivity based on the second exposure time;

determine whether the expected ISO light sensitivity is greater than a preset threshold; and perform the following:

determine, when the expected ISO light sensitivity is greater than the preset threshold, the first exposure time as an exposure time used by the camera to photograph the third image; or determine, when the expected ISO light sensitivity is not greater than the preset threshold, the second exposure time as an exposure time used by the camera to photograph the third image; and wherein the second image is the first image and the third image is the image frame first displayed in the L image frames; or the second image and the third image are two adjacent image frames in the L image frames.

12. The electronic device according to claim 9, wherein the first step size is less than the flicker period.

13. The electronic device according to claim 9, wherein the computer program code is further executable by the processor is further configured to:
   obtain R image frames captured by the camera, wherein the R image frames comprise the first image, each of the R image frames comprises the photographed subject; and R is an integer greater than 2; and
   determine, by determining whether a location of the photographed subject changes in two adjacent image frames in the R image frames, whether a relative motion exists between the photographed subject in the first image and the electronic device; and
   wherein a relative motion exists between the photographed subject in the first image and the electronic device when there are pixels of which the velocity variations are inconsistent in the two-dimensional velocity vector field.

14. The electronic device according to claim 9, wherein the computer program code is further executable by the processor to:
   perform motion blur detection on the L image frames and determine a value of L based on a result of the motion blur detection; wherein a motion blur exists in an $(L-1)^{th}$ image frame in the L image frames, and no motion blur exists in an $L^{th}$ image frame in the L image frames.

15. The electronic device according to claim 9, wherein the computer program code is further executable by the processor to:
   detect a first user operation, wherein the first user operation is used to stop recording a video; and
   save, as a video, K image frames that are captured by the camera and that are displayed at the photographing interface; wherein K is a positive integer, wherein a frame interval of the K image frames is the same as the frame interval of the L image frames, and an exposure time of any one of the K image frames is the same as an exposure time of an image frame last displayed in the L image frames.

16. The electronic device according to claim 9, wherein the computer program code is further executable by the processor to:
   obtain H image frames captured by the camera, wherein H is a positive integer; and
   save the H image frames as a video, wherein the H image frames comprise the L image frames or one or more of the L image frames.

17. A non-transitory computer-readable storage medium, comprising computer instructions, wherein when the computer instructions are run on an electronic device comprising a camera and a display, the electronic device is enabled to:
   display a photographing interface on the display, wherein the photographing interface is configured to display a first image captured by the camera;
   sequentially display, when a relative motion exists between a photographed subject in the first image and the electronic device, L image frames captured by the camera at the photographing interface, wherein exposure times of the L image frames are different and sequentially decreased, an exposure time of an image frame first displayed in the L image frames is the same as an exposure time of the first image, and L is an integer greater than 2;
   determine a flicker period of an artificial light source when the artificial light source is present in a photographing environment; and
   adjust, based on the flicker period, a frame interval for photographing the L image frames, wherein the frame interval is an interval between photographing two adjacent frames of images in the L image frames by the camera, and the frame interval is an integer multiple of the flicker period.

* * * * *

UNITED STATES PATENT AND TRADEMARK OFFICE
CERTIFICATE OF CORRECTION

PATENT NO. : 12,279,047 B2
APPLICATION NO. : 18/251016
DATED : April 15, 2025
INVENTOR(S) : Hanyu Feng Page 1 of 1

It is certified that error appears in the above-identified patent and that said Letters Patent is hereby corrected as shown below:

In the Claims

In Column 36, in Claim 9, Line 25, after "processor" delete "is configured".

In Column 37, in Claim 13, Line 7, after "processor" delete "is further configured".

Signed and Sealed this
Tenth Day of June, 2025

Coke Morgan Stewart
*Acting Director of the United States Patent and Trademark Office*